(12) United States Patent  (10) Patent No.: US 7,783,390 B2
Miller  (45) Date of Patent: Aug. 24, 2010

(54) METHOD FOR DEFERRING DEMAND FOR ELECTRICAL ENERGY

(75) Inventor: Craig Howard Miller, Alexandria, VA (US)

(73) Assignee: GridPoint, Inc., Arlington, VA (US)

( * ) Notice: Subject to any disclaimer, the term of this patent is extended or adjusted under 35 U.S.C. 154(b) by 0 days.

(21) Appl. No.: 11/837,888

(22) Filed: Aug. 13, 2007

(65) Prior Publication Data

US 2007/0276547 A1 Nov. 29, 2007

Related U.S. Application Data

(63) Continuation of application No. 11/144,834, filed on Jun. 6, 2005, now Pat. No. 7,274,975.

(51) Int. Cl.
*G06F 19/00* (2006.01)
*G01M 1/38* (2006.01)
*G05B 15/00* (2006.01)

(52) U.S. Cl. .......... 700/291; 700/286; 700/295

(58) Field of Classification Search .......... 700/286, 700/291, 295–296; 705/412
See application file for complete search history.

(56) References Cited

U.S. PATENT DOCUMENTS

| | | | |
|---|---|---|---|
| 2,082,110 A | 6/1937 | Langabeer | |
| 4,104,539 A | 8/1978 | Hase | |
| 4,264,960 A * | 4/1981 | Gurr | ............ 700/295 |
| 4,315,163 A | 2/1982 | Bienville | |
| 4,381,457 A | 4/1983 | Wiles | |
| 4,384,214 A | 5/1983 | Crick et al. | |
| 4,724,332 A | 2/1988 | Finger | |
| 4,733,223 A | 3/1988 | Gilbert | |
| 4,742,291 A | 5/1988 | Bobier et al. | |
| 4,742,441 A | 5/1988 | Akerson | |
| 4,894,764 A | 1/1990 | Meyer et al. | |
| 4,899,270 A | 2/1990 | Bond | |
| 4,942,509 A | 7/1990 | Shires et al. | |
| RE33,504 E | 12/1990 | Yuhasz et al. | |
| 5,150,685 A | 9/1992 | Porter et al. | |

(Continued)

FOREIGN PATENT DOCUMENTS

EP    1260886    5/2002

(Continued)

OTHER PUBLICATIONS

Archived various web pages originally available from www.smarthome.com; dates of first publication unknown, but all believed to be prior to Jun. 6, 2005.

(Continued)

*Primary Examiner*—Michael D Masinick
(74) *Attorney, Agent, or Firm*—Greenberg Traurig, LLP

(57) ABSTRACT

Methods and systems are provided for optimizing the control of energy supply and demand. An energy control unit includes one or more algorithms for scheduling the control of energy consumption devices on the basis of variables relating to forecast energy supply and demand. Devices for which energy consumption can be scheduled or deferred are activated during periods of cheapest energy usage. Battery storage and alternative energy sources (e.g., photovoltaic cells) are activated to sell energy to the power grid during periods that are determined to correspond to favorable cost conditions.

6 Claims, 15 Drawing Sheets

U.S. PATENT DOCUMENTS

| | | |
|---|---|---|
| 5,155,672 A | 10/1992 | Brown |
| 5,206,537 A | 4/1993 | Alejandro et al. |
| 5,218,282 A | 6/1993 | Duhame |
| 5,220,746 A | 6/1993 | Yeager |
| 5,278,480 A | 1/1994 | Murray |
| 5,286,967 A | 2/1994 | Bates |
| 5,338,369 A | 8/1994 | Rawlings |
| 5,373,433 A | 12/1994 | Thomas |
| 5,396,165 A | 3/1995 | Hwang et al. |
| 5,410,720 A | 4/1995 | Osterman |
| 5,412,297 A | 5/1995 | Clark et al. |
| 5,424,915 A | 6/1995 | Katooka et al. |
| 5,457,600 A | 10/1995 | Campbell et al. |
| 5,465,011 A | 11/1995 | Miller et al. |
| 5,565,843 A | 10/1996 | Meyvis |
| 5,572,438 A | 11/1996 | Ehlers et al. |
| 5,576,533 A | 11/1996 | Tantraporn |
| 5,583,413 A | 12/1996 | Proctor et al. |
| 5,590,495 A | 1/1997 | Bressler et al. |
| 5,600,540 A | 2/1997 | Blomquist |
| 5,612,580 A | 3/1997 | Janonis et al. |
| 5,619,077 A | 4/1997 | Green et al. |
| 5,621,662 A | 4/1997 | Humphries et al. |
| 5,629,601 A | 5/1997 | Feldstein |
| 5,635,770 A | 6/1997 | Evans, Jr. et al. |
| 5,642,002 A | 6/1997 | Mekanik et al. |
| 5,649,839 A | 7/1997 | Yu |
| 5,656,919 A | 8/1997 | Proctor et al. |
| 5,675,123 A | 10/1997 | Proctor et al. |
| 5,719,758 A | 2/1998 | Nakata et al. |
| 5,739,596 A | 4/1998 | Takizawa et al. |
| 5,761,083 A | 6/1998 | Brown, Jr. et al. |
| 5,786,642 A | 7/1998 | Wilhelm |
| 5,789,828 A | 8/1998 | Tremaine et al. |
| 5,793,125 A | 8/1998 | Tarng |
| 5,815,086 A | 9/1998 | Ivie et al. |
| 5,844,326 A | 12/1998 | Proctor et al. |
| 5,895,440 A | 4/1999 | Proctor et al. |
| 5,903,446 A | 5/1999 | Ituillet et al. |
| 5,917,251 A | 6/1999 | Schermann et al. |
| 5,939,855 A | 8/1999 | Proctor et al. |
| 5,949,640 A | 9/1999 | Cameron et al. |
| 5,969,435 A | 10/1999 | Wilhelm |
| 5,982,652 A | 11/1999 | Simonelli et al. |
| 5,994,892 A | 11/1999 | Turino et al. |
| 6,021,052 A | 2/2000 | Unger et al. |
| 6,028,426 A | 2/2000 | Cameron et al. |
| 6,038,156 A | 3/2000 | Inam et al. |
| 6,068,513 A | 5/2000 | Cameron et al. |
| 6,097,108 A | 8/2000 | Tweed |
| 6,134,124 A | 10/2000 | Jungreis et al. |
| 6,177,737 B1 | 1/2001 | Palfey et al. |
| 6,199,136 B1 | 3/2001 | Shteyn |
| 6,215,281 B1 | 4/2001 | Koch |
| 6,225,780 B1 | 5/2001 | Koch |
| 6,226,600 B1 | 5/2001 | Rodenberg, III et al. |
| 6,259,017 B1 | 7/2001 | Takehara et al. |
| 6,278,279 B1 | 8/2001 | Daun-Lindberg et al. |
| 6,288,916 B1 | 9/2001 | Liu et al. |
| 6,297,977 B1 | 10/2001 | Huggett et al. |
| 6,304,006 B1 | 10/2001 | Jungreis |
| 6,310,783 B1 | 10/2001 | Winch et al. |
| 6,347,925 B1 | 2/2002 | Woodard et al. |
| 6,353,304 B1 | 3/2002 | Atcitty et al. |
| 6,365,990 B2 | 4/2002 | Flegel |
| 6,370,890 B2 | 4/2002 | Roh et al. |
| 6,400,591 B2 | 6/2002 | Reilly et al. |
| 6,404,075 B1 | 6/2002 | Potter et al. |
| 6,404,658 B1 | 6/2002 | Reilly |
| 6,424,119 B1 | 7/2002 | Nelson et al. |
| 6,428,694 B1 | 8/2002 | Brown |
| 6,445,088 B1 | 9/2002 | Spitaels et al. |
| 6,489,561 B2 | 12/2002 | Ziegler et al. |
| 6,507,169 B1 | 1/2003 | Holtom et al. |
| 6,538,343 B1 | 3/2003 | Stewart |
| 6,541,941 B2 | 4/2003 | Adams et al. |
| 6,556,410 B1 | 4/2003 | Manning et al. |
| 6,560,131 B1 | 5/2003 | vonBrethorst |
| 6,570,269 B2 | 5/2003 | McMillan et al. |
| 6,579,168 B1 | 6/2003 | Webster et al. |
| 6,587,051 B2 | 7/2003 | Takehara et al. |
| 6,593,856 B1 | 7/2003 | Madau |
| 6,602,627 B2 | 8/2003 | Liu et al. |
| 6,614,132 B2 | 9/2003 | Hockney et al. |
| 6,618,709 B1 | 9/2003 | Sneeringer |
| 6,630,751 B2 | 10/2003 | Curtis et al. |
| 6,657,320 B1 | 12/2003 | Andrews et al. |
| 6,668,565 B1 | 12/2003 | Johnson et al. |
| 6,675,872 B2 | 1/2004 | Lewis et al. |
| 6,681,156 B1 | 1/2004 | Weiss |
| 6,689,507 B1 | 2/2004 | Tsutsumi et al. |
| 6,693,371 B2 | 2/2004 | Ziegler et al. |
| 6,695,577 B1 | 2/2004 | Susek |
| 6,700,214 B2 | 3/2004 | Ulinski et al. |
| 6,702,661 B1 | 3/2004 | Clifton et al. |
| 6,704,198 B2 | 3/2004 | Replogle et al. |
| 6,718,213 B1 * | 4/2004 | Enberg ................... 700/22 |
| 6,720,107 B1 | 4/2004 | Holtom et al. |
| 6,721,672 B2 | 4/2004 | Spitaels et al. |
| 6,722,142 B1 | 4/2004 | Pagel |
| 6,741,007 B2 | 5/2004 | Frash et al. |
| 6,741,442 B1 | 5/2004 | McNally et al. |
| 6,745,590 B1 | 6/2004 | Johnson et al. |
| 6,747,378 B2 | 6/2004 | Brackett |
| 6,750,391 B2 | 6/2004 | Bower et al. |
| 6,756,998 B1 | 6/2004 | Bilger |
| 6,817,266 B1 | 11/2004 | Brackett |
| 6,823,223 B2 | 11/2004 | Gonzales et al. |
| 6,824,861 B2 | 11/2004 | Spears |
| 6,826,267 B2 | 11/2004 | Daum et al. |
| 6,841,971 B1 | 1/2005 | Spee et al. |
| 6,847,196 B2 | 1/2005 | Garabandic |
| 6,852,401 B2 | 2/2005 | Spears et al. |
| 6,856,236 B2 | 2/2005 | Christensen et al. |
| 6,859,669 B2 | 2/2005 | An |
| 6,865,685 B2 | 3/2005 | Hammond et al. |
| 6,869,309 B2 | 3/2005 | Ziegler et al. |
| 6,874,691 B1 | 4/2005 | Hildebrand et al. |
| 6,875,591 B1 | 4/2005 | Hildebrand et al. |
| 6,884,039 B2 | 4/2005 | Woodard et al. |
| 6,889,752 B2 | 5/2005 | Stoller |
| 6,900,556 B2 | 5/2005 | Provanzana et al. |
| 6,917,124 B2 | 7/2005 | Shetler, Jr. et al. |
| 6,924,731 B2 | 8/2005 | Fallon et al. |
| 6,925,361 B1 | 8/2005 | Sinnock |
| 6,963,802 B2 | 11/2005 | Enis et al. |
| 7,043,380 B2 | 5/2006 | Rodenberg, III et al. |
| 7,123,994 B2 | 10/2006 | Weik et al. |
| 7,155,912 B2 * | 1/2007 | Enis et al. ................. 60/652 |
| 2001/0048373 A1 | 12/2001 | Sandelman |
| 2002/0000092 A1 | 1/2002 | Sharood et al. |
| 2002/0052940 A1 | 5/2002 | Myers et al. |
| 2002/0063368 A1 | 5/2002 | Kabir |
| 2002/0063625 A1 | 5/2002 | Takehara et al. |
| 2002/0135232 A1 | 9/2002 | McMillan |
| 2002/0135983 A1 | 9/2002 | Freitas et al. |
| 2002/0138785 A1 | 9/2002 | Hammond et al. |
| 2002/0149796 A1 | 10/2002 | Ominato |
| 2002/0153865 A1 | 10/2002 | Nelson et al. |
| 2002/0167174 A1 | 11/2002 | Haass et al. |
| 2003/0002261 A1 | 1/2003 | Berry et al. |
| 2003/0009265 A1 * | 1/2003 | Edwin ................... 700/295 |
| 2003/0029600 A1 | 2/2003 | Woodard et al. |
| 2003/0033545 A1 | 2/2003 | Wenisch et al. |

| Publication | Date | Inventor |
|---|---|---|
| 2003/0033548 A1 | 2/2003 | Kuiawa et al. |
| 2003/0036820 A1* | 2/2003 | Yellepeddy et al. ......... 700/291 |
| 2003/0047209 A1 | 3/2003 | Yanai et al. |
| 2003/0048964 A1 | 3/2003 | Brackett et al. |
| 2003/0052558 A1 | 3/2003 | Brackett et al. |
| 2003/0061898 A1 | 4/2003 | Brackett et al. |
| 2003/0113599 A1 | 6/2003 | Pearson |
| 2003/0139888 A1 | 7/2003 | Burns |
| 2003/0192582 A1 | 10/2003 | Guevara |
| 2003/0198938 A1 | 10/2003 | Murray et al. |
| 2003/0201672 A1 | 10/2003 | Stranberg et al. |
| 2003/0218385 A1 | 11/2003 | Bronicki |
| 2003/0220803 A1 | 11/2003 | Giaquinto et al. |
| 2003/0221141 A1 | 11/2003 | Wenisch |
| 2003/0222618 A1 | 12/2003 | Kanouda et al. |
| 2003/0231003 A1 | 12/2003 | Ballard et al. |
| 2004/0013923 A1 | 1/2004 | Molter et al. |
| 2004/0019489 A1 | 1/2004 | Funk et al. |
| 2004/0039821 A1 | 2/2004 | Giglio et al. |
| 2004/0053082 A1 | 3/2004 | McClusky et al. |
| 2004/0056638 A1 | 3/2004 | Bamber et al. |
| 2004/0066094 A1 | 4/2004 | Suzuki et al. |
| 2004/0076809 A1 | 4/2004 | Spears |
| 2004/0099747 A1 | 5/2004 | Johnson et al. |
| 2004/0135551 A1 | 7/2004 | Hoff et al. |
| 2004/0149796 A1 | 8/2004 | Cohen |
| 2004/0151011 A1 | 8/2004 | Toyomura et al. |
| 2004/0189097 A1 | 9/2004 | Gottlieb et al. |
| 2004/0201940 A1 | 10/2004 | Fournier et al. |
| 2004/0213384 A1 | 10/2004 | Alles et al. |
| 2004/0231875 A1 | 11/2004 | Rasmussen et al. |
| 2004/0249922 A1 | 12/2004 | Hackman et al. |
| 2004/0257766 A1 | 12/2004 | Rasmussen et al. |
| 2004/0260407 A1 | 12/2004 | Wimsatt |
| 2004/0267909 A1 | 12/2004 | Autret |
| 2005/0002214 A1 | 1/2005 | Deng et al. |
| 2005/0015682 A1 | 1/2005 | Colucci et al. |
| 2005/0029984 A1 | 2/2005 | Cheng et al. |
| 2005/0036248 A1 | 2/2005 | Klikic et al. |
| 2005/0068012 A1 | 3/2005 | Cutler |
| 2005/0077881 A1 | 4/2005 | Capp et al. |
| 2005/0083014 A1 | 4/2005 | Baumgartner |
| 2005/0144616 A1 | 6/2005 | Hammond et al. |
| 2005/0162019 A1 | 7/2005 | Masciarelli et al. |
| 2005/0162129 A1 | 7/2005 | Mutabozija et al. |
| 2005/0162836 A1 | 7/2005 | Briggs et al. |
| 2005/0164546 A1 | 7/2005 | Johnson, Jr. et al. |
| 2005/0164563 A1 | 7/2005 | Schuttler et al. |
| 2005/0168073 A1 | 8/2005 | Hjort |
| 2006/0158037 A1 | 7/2006 | Danley et al. |
| 2006/0171086 A1 | 8/2006 | Hennessy et al. |
| 2006/0259199 A1 | 11/2006 | Gjerde et al. |
| 2007/0005195 A1 | 1/2007 | Pasquale et al. |

FOREIGN PATENT DOCUMENTS

| | | |
|---|---|---|
| JP | 062271529 | 11/1987 |
| JP | 05076065 | 3/1993 |
| JP | 52581910 | 10/1993 |
| JP | 05289694 | 11/1993 |
| JP | 05300564 | 11/1993 |
| JP | 06225360 | 8/1994 |
| JP | 07057170 | 3/1995 |
| JP | 07322363 | 12/1995 |
| JP | 08019193 | 1/1996 |
| JP | 08195823 | 7/1996 |
| JP | 010079800 | 3/1998 |
| JP | 010145505 | 5/1998 |
| JP | 011069007 | 3/1999 |
| JP | 09179909 | 7/1999 |
| JP | 2000069575 | 3/2000 |
| JP | 2000184471 | 6/2000 |
| JP | 2002111887 | 4/2002 |
| JP | 2002132292 | 5/2002 |
| JP | 2002152858 | 5/2002 |
| JP | 2003224892 | 8/2003 |
| JP | 2004214937 | 7/2004 |
| JP | 2004320773 | 11/2004 |
| WO | 9749225 | 12/1997 |
| WO | 9934339 | 7/1999 |
| WO | 0025478 | 5/2000 |
| WO | 0213039 | 2/2002 |
| WO | 0221661 | 3/2002 |
| WO | 0228106 | 4/2002 |
| WO | 0245039 | 6/2002 |
| WO | 03049379 | 6/2003 |
| WO | 03085895 | 10/2003 |
| WO | 03093916 | 11/2003 |
| WO | 2004043004 | 5/2004 |
| WO | 2004089035 | 10/2004 |
| WO | 2004105211 | 12/2004 |
| WO | 2005018156 | 2/2005 |
| WO | 2006086015 | 8/2006 |

OTHER PUBLICATIONS

"Distributed Energy & Electric Reliability—Fact Sheet" (Orion Engineering Corporation), Jan. 2003, 2 pages.

T. Regan, et al., "Distributed Energy Neural Network Integration System (DENNIS™)" slide show, Jan. 2002, 14 pages.

Wills, R.H., et al., "The AC Photovoltaic Module Concept", Energy Conversion Engineering Conference, 1997, IECEC-07. Proceedings of the 32nd Intersociety vol. 3, Date: Jul. 27-Aug. 1, 1997, pp. 1562-1563 (vol. 3).

Chen, et al., "Three-Phase Boost-Type Grid-Connected Inverters", Applied Power Electronics Conference and Exposition, 2006. APEC '06, Twenty-First Annual IEEE, Date: Mar. 10-23, 2006, 7 pages.

Enslin, J.H.R., et al., "Combined Low-Cost, High-Efficient Inverter, Peak Power Tracker and Regulator for PV Applications", Power Electronics, IEEE Transactions on vol. 6, Issue 1, Date: Jan. 1991, pp. 73-82.

Ro, Kyoungsoo, Two-Loop Controller for Maximizing Performance of a Grid-Connected Photovoltaic-Fuel Cell Hybrid Power Plant, Date: Apr. 14, 1997, Virginia Polytechnic Institute and State University (dissertation).

Regan, T., et al., "Distributed Energy Neural Network Integration System", Year One Final Report, National Renewable Energy Laboratory, Jun. 2003, 120 pages.

Web page titled, Consumer Information: downloaded from <http://web.archive.org/web/20040423134107/http://www.theenergydetective.com/consumer.asp>; published on or before Apr. 2004.

Web page titled, T.E.D.-Home: downloaded from <http://web.archive.org/web/20050313073709/http://www.theenergydetective.com/frameset.asp>; published on or before Mar. 2005.

SunTie XR Product Information; <www.xantrex.com>; accessed Dec. 20, 2004.

SunTie XR Specifications; <www.xantrex.com>; accessed Dec. 20, 2004.

Xantrex GT 3.0—Specifications Table; <www.xantrex.com>; accessed Dec. 20, 2004.

Xantrex Grid Tie Solar Inverter 3.0; <www.xantrex.com>; accessed Dec. 20, 2004.

SW Inverter/Charger—120 VAC/60 Hz Product Information; <www.xantrex.com>; accessed Dec. 20, 2004.

SW Inverter/Chargers, Advanced Sine Wave Power—120 VAC/60 Hz Models; <www.xantrex.com>; accessed Dec. 20, 2004.

Xantrex—Wind Power at Home; <www.xantrex.com>; accessed Dec. 20, 2004.

Xantrex Backup Power System; <www.xantrex.com>; accessed Dec. 20, 2004.

Xantrex Backup Power System Product Information; <www.xantrex.com>; accessed Dec. 20, 2004.

Xantrex Commercial Power Module Systems; <www.xantrex.com>; accessed Dec. 4, 2004.

Xantrex Product Brochure; <www.xantrex.com>; accessed Dec. 4, 2004.

Backup Electrical Power Systems Brochure; Trace and Xantrex; <www.xantrex.com>: accessed Dec. 4, 2004.

Northern Arizona Wind & Sun Solar Insulation Map, <http://www.windsun.com/Solar_Basics/Solar_maps.htm>; date of first publication unknown, but at least as early as May 18, 2005.

ISR and WO of PCT/US06/18465 dated Apr. 20, 2007.

Partial International Search of PCT/US2006/000009 dated Jul. 6, 2007.

* cited by examiner

US 7,783,390 B2

METHOD FOR DEFERRING DEMAND FOR ELECTRICAL ENERGY

CROSS-REFERENCE TO RELATED APPLICATIONS

This application is a continuation of U.S. patent application Ser. No. 11/144,834, titled "Optimized Energy Management System" and filed Jun. 6, 2005. Said application is incorporated by reference herein.

FIELD OF THE INVENTION

The invention relates generally to the field of energy management, and more particularly, to various systems and methods for optimizing the control of energy supply and demand in residences and businesses.

BACKGROUND OF THE INVENTION

As energy demand around the world has increased, pressure from environmental concerns and energy price volatility has heightened the need for energy conservation and alternative energy sources. Programmable thermostats have permitted consumers to program their heating and cooling systems to reduce consumption during periods when they are not home or are asleep. Solar panels, fuel cells, windmills, backup generators and other energy sources have become increasingly available for use in residential homes and businesses. However, the use of such alternative sources and technologies has been limited because of such factors as difficulty in recovering costs; unpredictability of alternative energy supplies (e.g., sun, wind), and difficulty in integrating such sources and devices into conventional electrical systems.

Electric utilities have conventionally arranged to install special devices in homes and businesses that, when remotely activated by the utility, cut power to certain devices (e.g., air conditioners or hot water heaters) during peak loading conditions. Customers who agree to install such devices are given discounts or other incentives for installing such devices, and in exchange the utility is able to better manage energy demand remotely. However, such arrangements are typically ad-hoc and require that customers submit to the whims of the utility company.

Some electric utilities charge varying rates based on demand. For example, during periods of peak demand, a higher rate for electricity is charged. Conversely, during low-demand periods, a lower rate can be charged. Regulators in recent years have also forced utilities to purchase electricity back from consumers who are able to generate more than they need. Such programs have met with limited success for various reasons most particularly the inability of some types of energy users to curtail energy use and the lack of real-time information regarding the immediate cost of energy usage.

SUMMARY OF THE INVENTION

The invention includes various systems and methods for increasing the efficiency with which energy can be managed. In one variation, an integrated control device manages the supply of energy from various sources (e.g., electric grid, battery, photovoltaic cells, fuel cells) and the demand for energy from consumption devices (e.g., hot-water heaters, HVAC systems, and appliances). An optimization algorithm determines based on various factors when to activate the energy sources and when to activate the consumption devices.

In one variation, the algorithm takes into account such factors as the supply of charge on batteries, the dynamic price of electricity, weather forecasts, and others in order to schedule and activate energy supplies and consumption devices. Devices that can be scheduled for flexible turn-on times (e.g., a washing machine or dishwasher) are scheduled for periods in which cheap energy supply is projected to be available.

In another variation, when the algorithm determines that electricity can be favorably sold to the electricity grid, alternative energy sources and storage devices are activated and electricity is sold to the grid. Customer preferences for maintaining control over the allocation of power can be taken into account in certain variations of the algorithm.

Other variations and embodiments are described in more detail below, and the invention is not intended to be limited in any way by this brief summary.

DETAILED DESCRIPTION OF THE INVENTION

Figure 1:
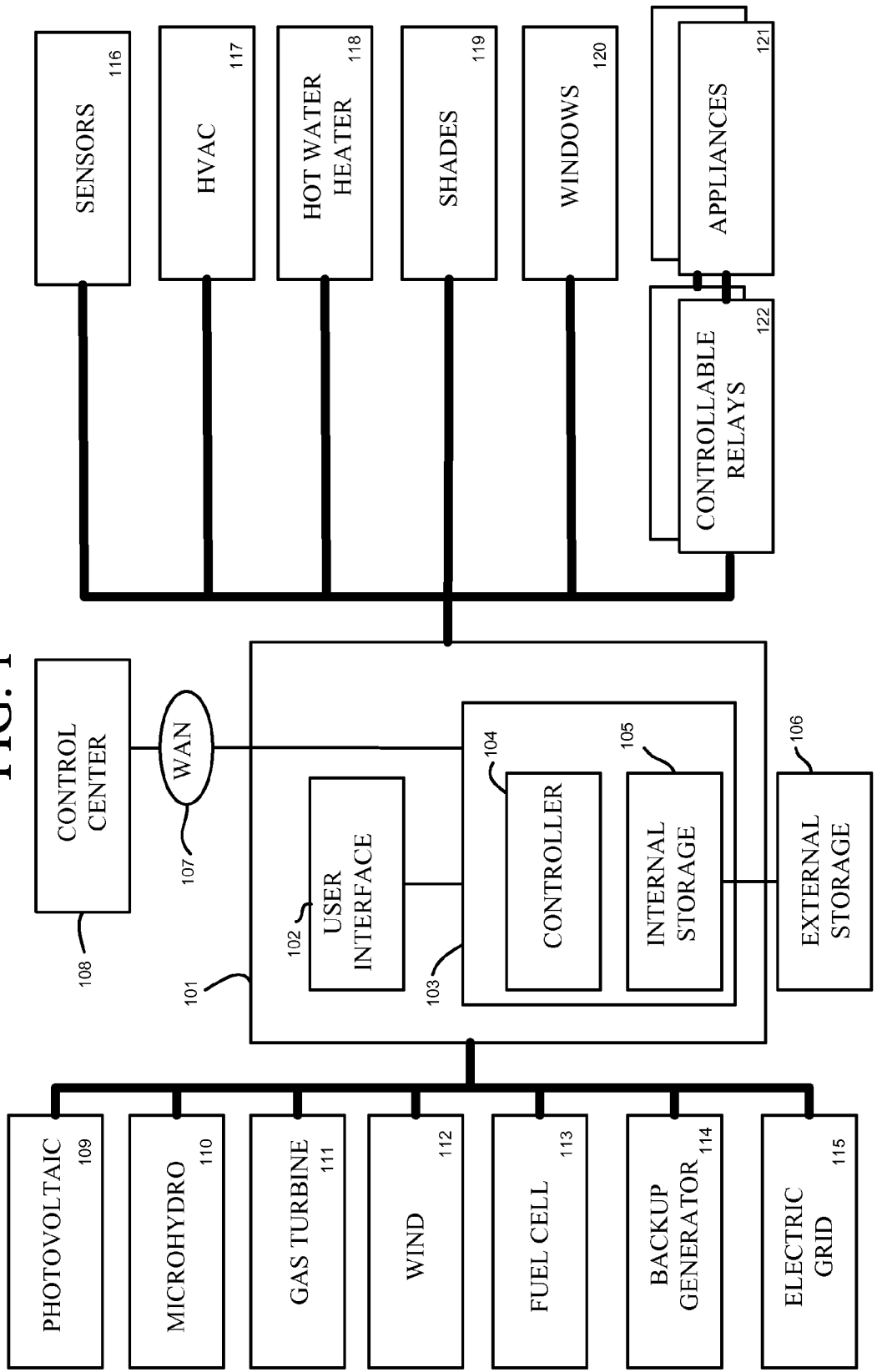
FIG. 1 shows a system employing various principles of the present invention.

FIG. 1 shows a system employing various principles of the present invention. As shown in FIG. 1, apparatus 101 includes a unit 103 comprising a controller 104 and an internal storage device 105. Internal storage device 105 may comprise, for example, a plurality of lead-acid or nickel-metal-hydride storage batteries for storing electrical energy, and/or large capacitors. External storage device 106 may be optionally included to store additional electrical energy. As explained in more detail herein, storage devices 105 and 106 may provide power to various devices during times of electrical grid outages or during periods where electrical grid costs exceed certain thresholds, and they may be used to sell power back to the electrical utility during times that are determined to be favorable. The storage capacities of devices 105 and 106 may be selected to suit a particular environment, such as the needs of a typical home residence, business, or other electrical consumer. The smallest storage capacity anticipated is 840 amp-hours (AH) at 12V, while currently planned units have capacities ranging to 1600 AH at 48V. Larger storage capacity may be obtained in the future using flywheels or very large capacitors.

Storage in the form of compressed air is usually discounted due to the poor thermodynamic efficiency, but the capital cost is low and in some cases the marginal value of solar power is zero (when supply exceeds demand the excess cannot be sold or stored by other means), so compressed air storage may be practical in some embodiments of the invention. Finally, in some specific locations it may be possible to store power by pumping water to an elevated water tower or reservoir (pumped storage) which could increase storage capacity by another factor of 10. Power electronics, including inverters for converting DC electrical energy into AC energy, circuit breakers, phase converters and the like, may also be included but are not separately shown in FIG. 1.

Controller 104 may comprise a computer and memory programmed with computer software for controlling the operation of apparatus 101 in order to receive electrical power from power sources 109 through 115 and to distribute electrical power to devices 116 through 122. Further details of various steps that may be carried out by such software are described in more detail herein.

Controller 104 and internal storage device 105 may be housed in a unit 103 such as a metal rack having appropriate cabling and support structures. One possible design for unit 103 is shown in a pending U.S. patent application Ser. No. 11/037,832 by Danley et al. filed on Jan. 18, 2005, entitled "Fully Integrated Power Storage and Supply Appliance with Power Uploading Capability" (published as U.S. Pat. Appl. Pub. No. 20060158037).

Apparatus 101 also includes a user interface 102 for controlling the operation of unit 103. The user interface may comprise a keypad and CRT, LED or LCD display panel or vacuum fluorescent type; a computer display and keyboard; or any other similar interface. The user interface may be used to select various modes of operation; to display information regarding the operation of the apparatus; and for programming the apparatus.

An optional control center 108 may be provided to transmit commands to apparatus 101 through a network, such as WAN 107 (e.g., the Internet). Control center 108 may be located at a remote location, such as a central control facility, that transmits commands to a plurality of units 101 located in different homes or businesses. In addition to transmitting commands, control center 108 may transmit pricing information (e.g., current price of electricity) so that controller 104 may make decisions regarding the control and distribution of electricity according to various principles of the invention.

Apparatus 101 is coupled to the electric utility grid 115 through a power interface (not shown), which may include circuit breakers, surge suppressors and other electrical devices. Electricity may be supplied in various forms, such as 110 volts or 240 volts commonly found in homes. A backup generator 114 may also be provided and be controlled by apparatus 101 when needed. One or more alternative energy sources 109 through 113 may also be provided in order to provide electrical power to the apparatus. Such sources may include photovoltaic (PV) cells 109, which may be mounted on a roof of the home or business; micro-hydroelectric power generators 110, which generate power based on the movement of water; gas turbines 111; windmills or other wind-based devices 112; and fuel cells 113. Other sources may of course be provided.

During normal operation, power from one or more of the power sources can be used to charge storage units 105 and 106 and/or to meet demand in addition to electric grid 115. During power outages or brownouts from grid 115, these additional power sources (as well as storage units 105 and 106) can be used to meet energy demand. Additionally, surplus power can be sold back to the power grid based on optimization of supply and demand calculations as explained in more detail herein.

The bold lines shown in FIG. 1 indicate electrical distribution paths. Control paths to and from the various devices are not separately shown but are implied in FIG. 1.

One or more power-consuming devices 116 through 122 may also be controlled by and receive power from apparatus 101. These include one or more sensors 116 (e.g., thermostats, occupancy sensors, humidity gauges and the like); heating/ventilation/air-conditioning units 117; hot water heaters 118; window shades 119; windows 120 (e.g., open/close and/or tint controls); and one or more appliances 121 (e.g., washing machines; dryers; dishwashers; refrigerators; etc.). Some appliances may be so-called "smart" appliances that can receive control signals directly from apparatus 101. Other conventional appliances can be controlled using one or more controllable relays 122. It is not necessary in all embodiments that apparatus 101 directly provide electricity to devices 116 through 112. For example, apparatus 101 could be tied into the electrical power system in a home or business and electricity would be supplied through that path to the devices. Appropriate cut-off devices and bypass switches would then be used, for example, in the event of a power outage to disconnect the home wiring system from the electrical grid and to connect apparatus 101 to the wiring network. Such schemes are conventional and no further details are necessary to understand their operation.

Figure 2:
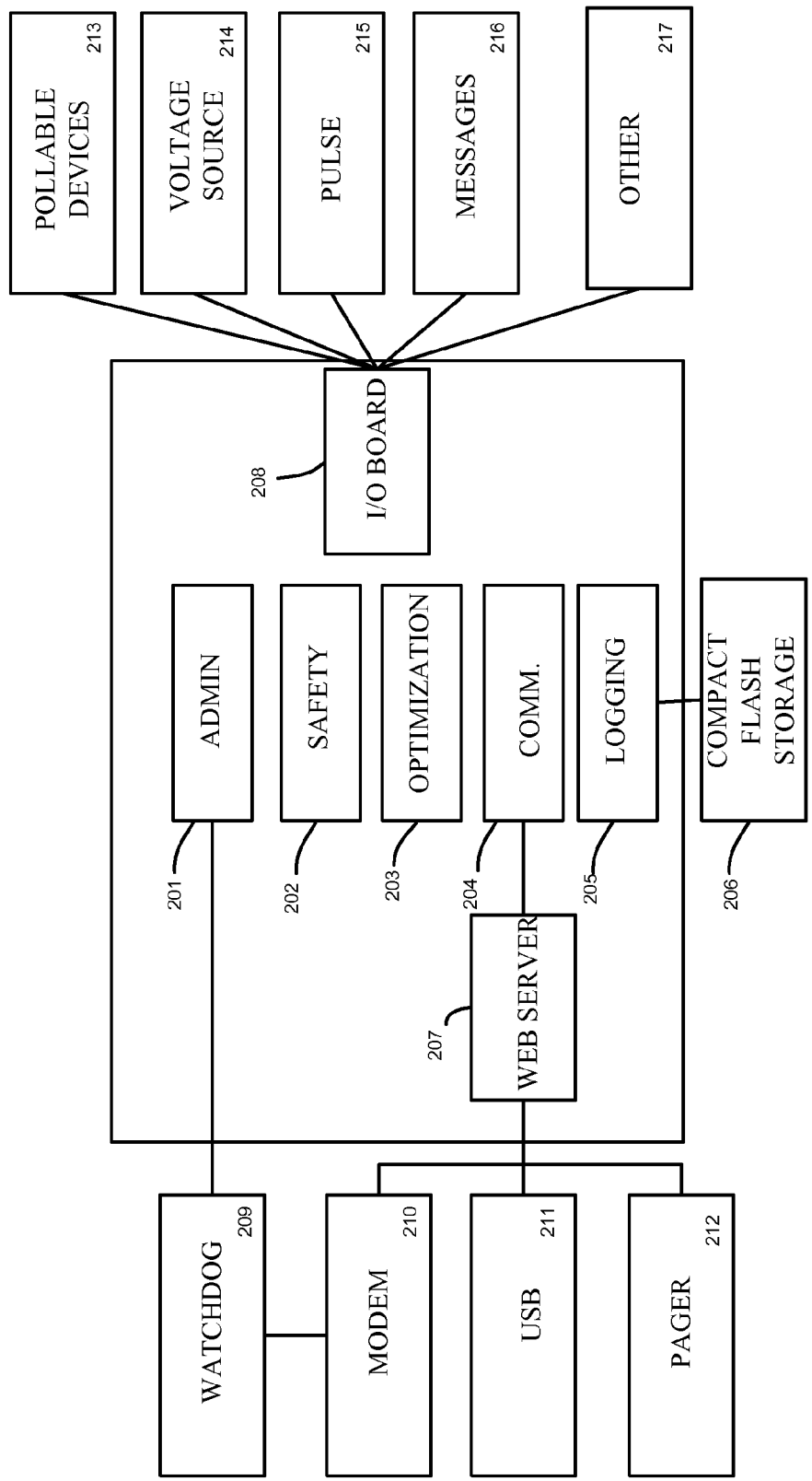
FIG. 2 shows one possible arrangement for controller 104 of FIG. 1.

FIG. 2 shows further details of controller 104 according to one variation of the invention. A watchdog timer 209 continuously monitors the operation of apparatus 101 in order to detect possible malfunctions. In one variation, watchdog timer 209 periodically polls devices in the system to ensure that they are functioning, and that no error signals have been detected. Watchdog timer 209 may be coupled to a modem 210 to report failures or other events to control center 108. A USB port 211 and pager interface 212 may also be provided to receive inputs from or report data to various devices. For example, the report of a malfunction can be transmitted to a pager worn by the owner of the premises in which the apparatus is located.

Various software functions shown in FIG. 2 include an administrative function 201, which may include such things as interfacing with watchdog timer 209; operating the user interface 102; controlling the modes of the apparatus; and other administrative operations. A safety function 202 monitors voltage levels, temperatures, and other variables in order to ensure that the apparatus is operating safely and to shut down the device if an unsafe condition is detected. An optimization function 203, details of which are provided below, makes decisions concerning whether and when to activate various power sources and power-consuming devices. A communication function 204 interfaces to a web server 207 in order to provide external communications facilities. A logging function 205 maintains records regarding the operation of the device and stores them in a nonvolatile device such as compact flash storage device 206. An input/output board 208 provides communication and control signals to various devices in the system, which may include pollable devices 213; voltage sources 214; pulse-based devices 215; message-based devices 216; and other types of devices 217. Various device drivers may also be provided but are not separately shown in FIG. 2. Rather than controlling devices directly, the apparatus can be configured to operate with a third-part home-automation control system in order to control the devices.

According to various principles of the invention, energy usage can be optimized to deliver power in the most efficient way, where efficiency is defined in terms of the amount of energy used, cost, or a balance of the two. In conventional energy management systems, emphasis has been on conservation—e.g., turning out lights when a room is not occupied, or turning down the thermostat at night. By integrating supply side options with energy consumption choices, various algorithms can be used to increase the energy and cost savings.

For example, a small business may pay for electricity on a per-kilowatt hour basis with an additional charge for a peak number of kilowatt-hours during a billing period. The so-called "demand rate" is designed to discourage peaky consumption because of the high cost of providing high amounts of power for a short period. According to various principles of the invention, the instantaneous energy usage can be monitored and, if demand exceeds a threshold, power from batteries can be used to reduce demand from the grid, or non-critical energy uses such as a large commercial freezer that can easily be unplugged for an extended time period with little or no impact can be temporarily shut off. This is made capable by several features of the invention. For example, the sensors (116) allow monitoring of individual loads. The direct controls (117, 118, 119, 120) allow for the interruption of certain appliances, while the controllable relays (122) allow for control of appliances without built-in control logic. Whether and to what extent an appliance can be interrupted is defined in the energy source configuration element (313), described with reference to FIG. 3 below. The method for addressing deferrable load which is described subsequently allows an electrical service (cooling in this example) to be optimally rescheduled for a later time to reduce cost.

As another example, suppose that residents of a house are cooking, showering, watching TV, and starting laundry. They pay time-of-use rates that are at a peak in the morning and evening, so power from the grid is 14 cents per KWh. Given the high price, according to various inventive principles, the system can control the laundry devices so that they are not activated until later in the day, when energy costs are cheaper. In one variation, the system can determine based on the date (e.g., June 21) and the weather forecast (e.g., sunny) that likely production from solar panels will be high, and decide to sell power from the batteries to the grid (when the rate is high) with the expectation that the batteries can be recharged later in the day when the family is not home and energy usage is minimal. The batteries could alternatively be recharged later in the day from the power grid, when electrical costs are lower.

Certain variations of the invention consider weather when forecasting demand for electrical power and the supply from energy sources whose production capacity is weather dependent, such as PV panels.

As yet another example, suppose that a power outage occurs, removing power from a home. Conventional back-up systems would immediately provide battery back-up or engage a back-up generator in order to supply power to pre-selected "critical" devices, such as freezers, refrigerators, selected lights, etc. According to certain principles of the invention, a controller programmed to optimize energy supply and usage would defer turning on the freezer or refrigerator during the first hour or two of the black-out, because of its knowledge that such devices can be disconnected from the power grid for an hour or two with little or no consequence, thus preserving energy. However, if the outage persists, backup power could be selectively applied to those devices, while inhibiting others. Other examples and principles are explained in more detail below.

There are at least two methods for managing loads during an emergency. The simpler method, which is currently the common approach for premises with backup energy systems, is to wire the facility with two (or more) circuits, one designated "secure" and the other "unsecure." When grid power is interrupted, services are maintained for the secure circuit only. The weakness of this approach is that the priorities for use of the limited backup supply change over the duration of an outage. Refrigeration is not immediately critical, but very important later. Upstairs lights may not be important during the day but very important at night.

Certain embodiments of the invention allow for control of individual appliances due to the connections to sensors (116), controllable appliances (117, 118, 119, and 120) and controllable relays (122). Appliance performance characteristics and criticality are expressed in the energy source configuration elements (313, discussed below). The system knows the amount of current storage and supply from alternative sources and can provide an accurate forecast of demand and alternative supply by methods described subsequently. Together these can provide the user with information to manage energy effectively in real time or to develop algorithms to be executed in the absence of direct control.

Figure 3:
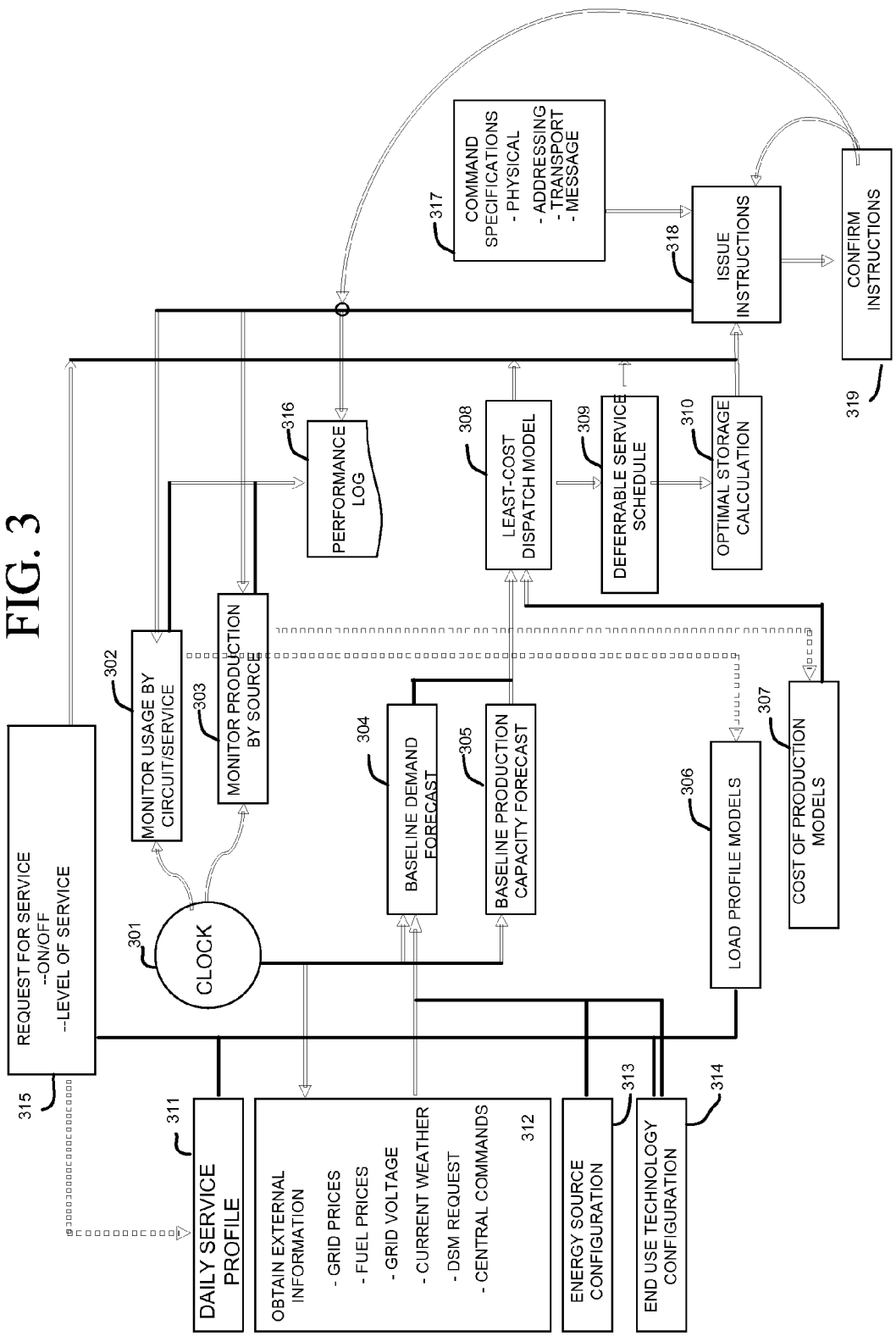
FIG. 3 shows a process and data/control flow for controlling energy production and usage in accordance with certain aspects of the present invention.

FIG. 3 shows a process and data/control flow for controlling energy production and usage in accordance with certain aspects of the present invention. A clock 301 acts as a control loop for the process. In step 302, energy usage is monitored by circuit or services, and in step 303, energy production is monitored by source. In step 312, external information regarding such variables as current grid prices; fuel prices; grid voltage; current/forecasted weather; demand-side management (DSM) requests (e.g., a request from a utility under an established demand response program for subscribing customers to reduce demand or supply power from a user controlled source at a specific hour), and commands received from central control center 108 are monitored. The current energy source configuration is determined (step 313), including such things as what power sources are available and how much energy is stored in storage devices. End use of technology configuration is obtained (step 314), including the inventory of technologies that consume energy in the home or business ranging from small sources such as lights to major HVAC equipment. The inventory may include the number of such appliances, the circuit on which they are located, how and to what extent they can be controlled, typical day-of-use patterns, and whether there is flexibility in scheduling the use of the appliance. For example, it may be possible to delay the hour at which the dishwasher is activated from the time it is loaded until a later hour, if the cost would be lower at that time. Block 314 can be provided through a user interface during a configuration step. Information from these blocks is input to a baseline demand forecast step 304 and a baseline production capacity forecast 305.

The demand forecast step 304 can be performed in many different ways. In one embodiment, energy demand is forecast based on historical data (e.g., energy demand based on the time of day and time of year for the particular facility in which the device is located). In another embodiment, energy demand can take into account ambient conditions such as temperature and sunshine. In yet another embodiment, one of several preprogrammed energy demand models can be selected by a user of the system. In one or more of these embodiments, energy demand can be forecasted at particular points in time (e.g., in five-minute increments) for a forecast period (e.g., 24 hours).

The baseline production capacity forecast step 305 can also be carried out in various ways. If solar cells are available, a production forecast can be based on a weather forecast (e.g., sunny, partly sunny, partly cloudy, cloudy, showers, etc.) in combination with time-of-year, in combination with historical data. If a fuel cell is available, data concerning production availability for the fuel cell can be obtained, and so forth. For sources which are not weather dependent, the production capacity (and efficiency as measured in terms of $/kWh) can be initially estimated from engineering data. The engineering estimated can be subsequently replaced with actual operating data which reflects the characteristics of the specific unit rather the general model.

For solar, the production capacity can be estimated as a function of solar insolation using the design efficiency data characteristic of the panel. Of course, this too may vary with the actual location and factors such as the amount of dust which has built up on the units since the last rain. These factors can be accounted for by two methods. Facility specific factors (facing, degree of shading) are incorporated through the collection of actual performance data over different seasons. Short-term factors are incorporated by the method of re-estimating the model parameters every 15 minutes, rather than simply executing the same model. The best predictor of production in the next 15 minutes is generally the previous 15 minutes.

The baseline demand forecast 304 and baseline production capacity forecast 305 provide a detailed picture of the potential supply of power by source and demand by use of energy. Essentially these frame an optimization problem which can be solved. Embodiments of the invention can determine how to modify demand by turning off unneeded services and/or delaying others, how to deploy various sources to meet demand, and how to distribute power to the grid to achieve the lowest possible cost of service (which may be negative if the home or business is able to produce more power than it consumes in a time period).

Given the input demand and supply projections, this optimization can be done in two basic steps—the calculations and the implementation. The calculation of the optimal strategy can be done in three parts. First, a least-cost dispatch model step 308 (details of which are provided below) determines the lowest cost way of meeting the unmodified demand using the available sources. This calculation provides an estimate of the expected value of power during the forecast period. This estimate is then used to determine which uses of energy should be deferred and until when. The deferrable service schedule is element 309 in FIG. 3. Details of 309 are provided below. The final step in the calculation is to determine when energy should be bought and sold (arbitraged), details of which are provided below.

Once the use of end-use technologies, sources, and storage have been determined in 308, 309, and 310, commands are issued to the devices to effect their operation in 318. Some of the devices can be under the direct control of the invention (e.g. the batteries) but others can be controlled by means of a communications interface. The means of communicating with appliances is specified in the configuration specification 317, in which the installer of the system specifies the physical means of communicating to the device, the communications protocols, the addressing protocols, and the structure and content of the messages. The means of communications can include wireless means (e.g. IEEE 802.11 networks of various generations, or IEEE 802.15.4 networks), radio frequency transmission over the power line (such as with X10), or Ethernet. The communications protocols can include Internet Protocols or methods designed for low cost, low bandwidth control such as LonWorks. The addressing protocols can include any method for distinguishing between multiple appliances connected to the same network. IP addresses are an example as is the naming scheme used by X10 (house code:unit code), but many home automation controllers implement proprietary schemes. The message structure is specific to the appliance design.

The following describes in more detail how the system can determine which of multiple, alternative sources of power to draw on to meet demand. These are methods of element 308 of FIG. 3. The explanation necessarily begins with a discussion of supply and demand management in the context of a grid connected system with one or more alternative energy sources.

Figure 4:
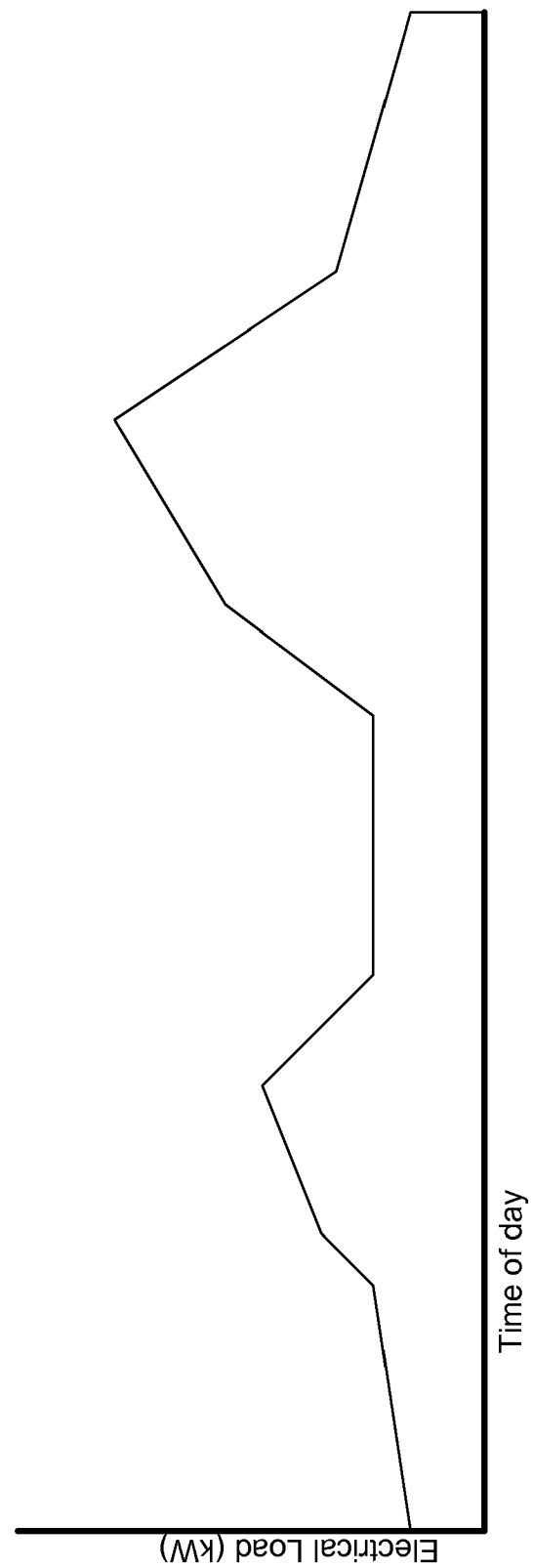
FIG. 4 shows a typical residential demand curve for electrical energy consumption.

Energy demand at a premise varies over the time of day. In a typical home there is a peak in the morning when the family gets up, turns on lights, radios and televisions, cooks breakfast, and heats hot water to make up for the amount used in showers. When the family leaves for work and school it may leave the clothes washer and dishwasher running, but when these are done, demand drops to a lower level but not to zero as the air conditioners, refrigerators, hot waters and the like continue to operate. Usage goes up as the family returns, peaking around dinner when the entire family is home. This creates the typical "double hump" demand curve as shown in FIG. 4.

Businesses tend to follow different patterns depending on the nature of the business. Usage is low when the office is closed, and relatively constant when the office is open. In extreme climates where air conditioning cannot be cut back overnight, energy use over the course of the day is more constant. Businesses like restaurants may start later in morning and their peak extends farther into the evening. A factory with an energy intensive process operating three shifts may show little or variation over the course of the day.

As alternative energy sources become available, management of electricity involves more than simply buying power from the grid. The question becomes when and to what extent power can be derived from the alternative sources, and when it is economically optimal to do so.

Figure 5:
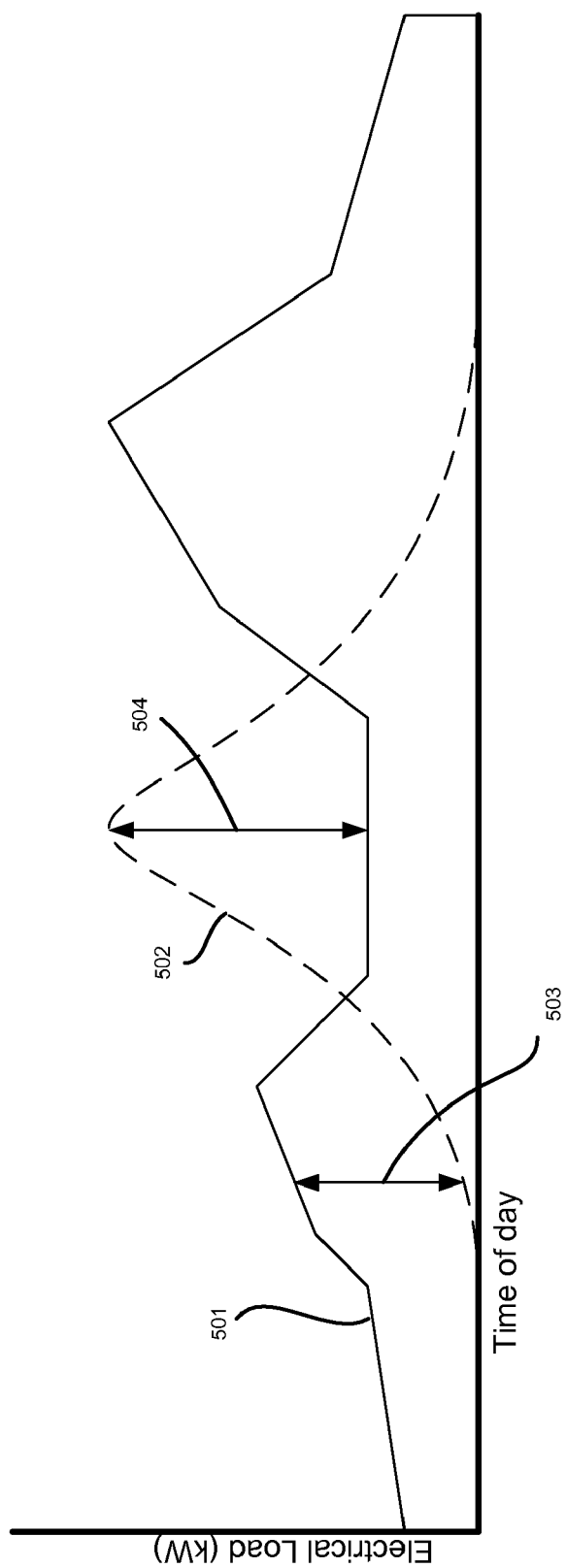
FIG. 5 shows a production curve for electricity from photovoltaic panels overlaid onto the demand curve of FIG. 4.

Each alternative source of energy has its own profile of capacity over the course of the day as well as fixed and marginal costs. FIG. 5 shows a production curve for electricity from photovoltaic panels (502) overlaid onto the demand curve (501). Since PV panels have zero marginal cost, they are the preferred source of power whenever available. PV panels, however, produce power only when the sun shines. On a clear day, power production is at its peak around the middle of the day (subject, of course to the orientation of the panels and possible obstructions such as large buildings or trees). When demand exceeds the power available from the PV panels, the difference must be made up with power purchased from the grid, as at 503 in FIG. 5. When solar power exceeds the demand, as at 504, the excess can be sold to the grid. The distance between the supply curve and the demand curve represents the amount of power available for sale at any instance (in kW). The integral of this power over a time interval is the energy sold (kWh).

Figure 6:
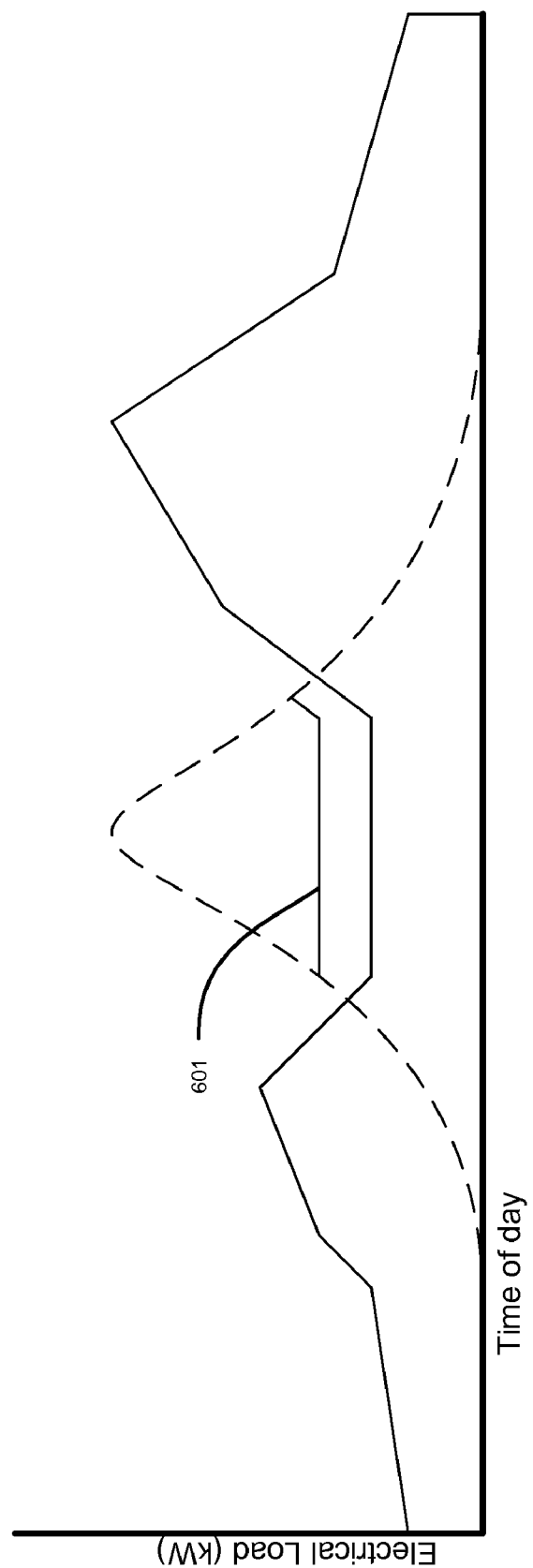
FIG. 6 shows how excess production may exceed the ability of the system's electronics to deliver power to the grid, meaning that a hardware constraint limits the rate of sale.

In some cases the excess production (shown as the distance between the supply and demand curves at any time) may exceed the ability of the system's electronics to deliver power to the grid. That is, there may be a hardware constraint that limits the rate of sale (measured in kW). This is shown by line 601 in FIG. 6 as an increment over the demand curve.

The example just presented assumes that there are two sources of electrical supply to the premise. These are the grid and the PV panels. Preference is generally given to the solar panels as a source when they are available because the marginal cost is zero while the marginal cost of the grid is the prevailing rate. There may, however, be one or more alternative sources with non-zero marginal cost. These may be used (deployed) when their marginal cost is lower than the other alternatives.

Figure 7:
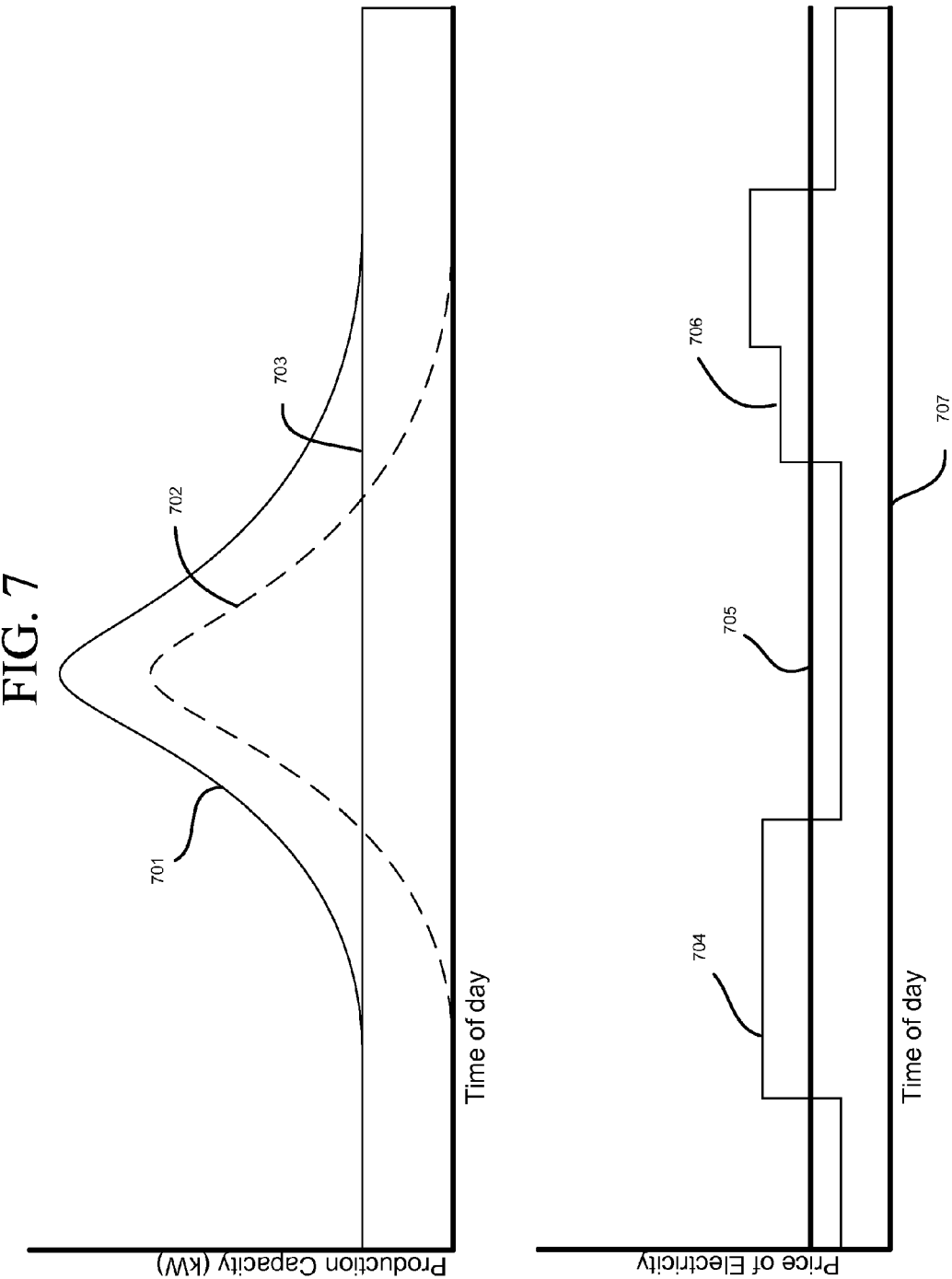
FIG. 7 shows the cost and availability of power from multiple sources.

This is shown in FIG. 7. The irregular curve in the bottom graph plots the price of electricity (in cents/kWh) over the course of a day. The area 704 represents the price of electricity from the grid. As is common in many areas, this varies over the course of the day. The time of day rates is designed to reflect the marginally higher cost of power production at the peak demand periods of morning and early evening. At these times utilities must dispatch power from their least efficient units, while, when cost is lower, they need power only from the most efficient units. In this rate diagram, there is a broad morning peak, and a peak and "shoulder" rate 706 in the early evening.

The line 705 shows the marginal cost of producing power from an alternative source A. This may be a fuel cell, a small scale hydroelectric turbine, a natural gas turbine, a wind generator, or a gasoline or diesel backup generator. In this example, this is a constant over the course of the day, but this is not necessarily the case. Marginal cost is shown here rather than total cost (which includes amortization of the capital cost and operating and maintenance costs not related to actual use) as the immediate decision on the relative merit of a potential source at any instant is related only to the marginal cost. The marginal cost of solar power is essentially zero. This is shown by line 707.

The upper graph shows the capacity of the solar panels 702 (which is a function of solar insolation, and hence, time of day) and the capacity of the Alternative Source A 703, which is shown as flat, but need not be. The capacity of the grid is not shown as is it presumed to exceed demand and is, therefore, irrelevant. Line 701 represents the total production capacity of the PV panels and Alternative Source A. The production capacity curves can be initially derived from engineering data provided by the supplier of the technology. These curves can then be updated based on data collected during actual use. The sensor, data logging, and computational capabilities of embodiments of the invention make it possible to re-estimate a linear production model every 15 minutes in one embodiment.

At any point in time, there is a particular order of preference in deriving power from the different sources. This is in increasing order of marginal cost beginning with the least expensive.

Figure 8:
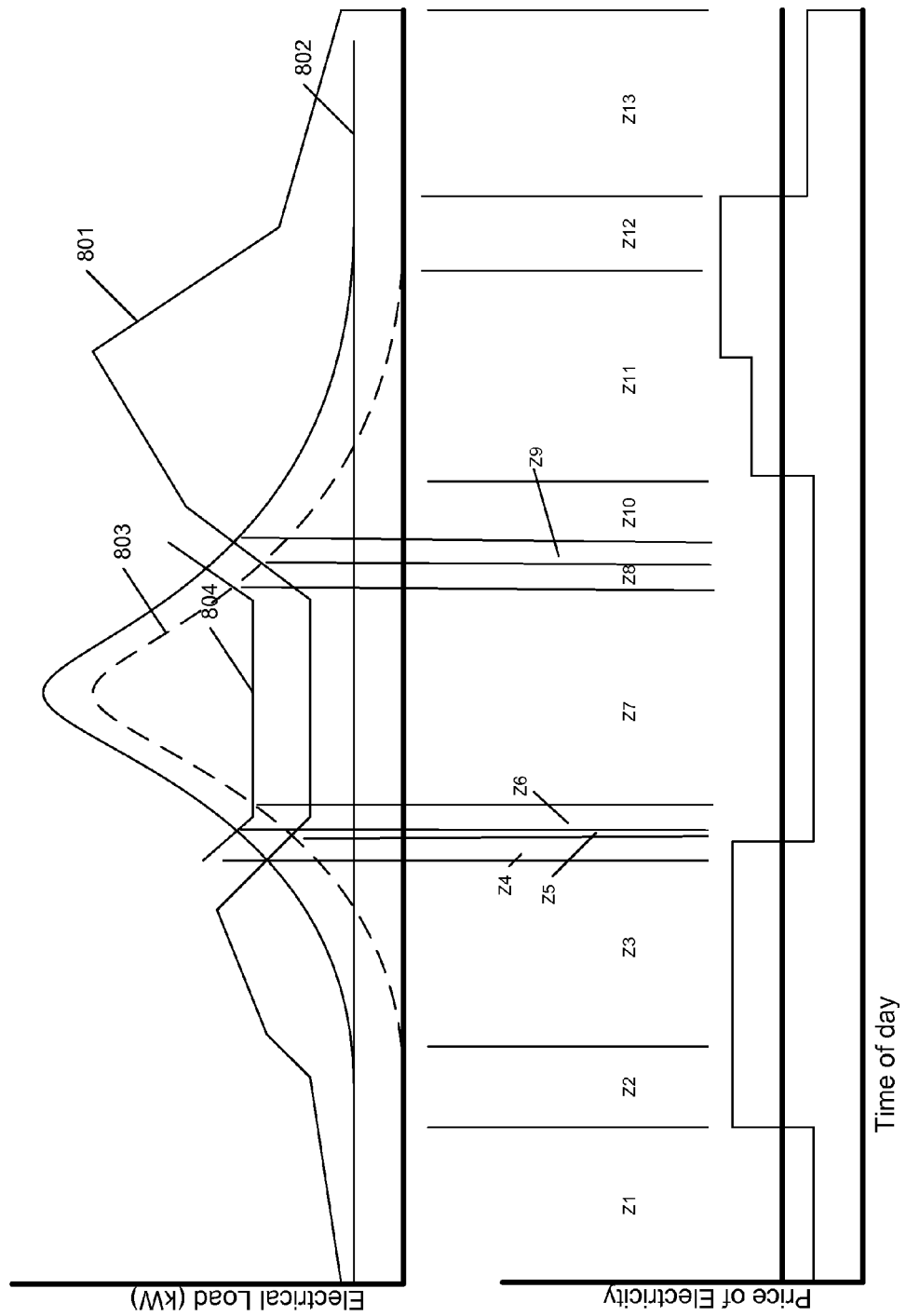
FIG. 8 shows a least-cost determination method according to one variation of the invention.

FIG. 8 shows a day divided into 13 zones, labeled Z1 through Z13 from morning until evening. These zones delineate different modes of operation, stemming either from a change in the relative prices of the different sources of energy or changes in demand relative to the capacity of the different sources. The modes of operation in this example are as follows:

Z1: There is no solar production and the marginal price of the alternative source is greater than the price from the grid. Demand is met entirely with purchases from the grid.

Z2: The price from the grid increases with the morning peak period and now exceeds the marginal cost of the alternative source. Production from the alternative source is immediately taken to its maximum, but this is not sufficient to supply the full demand. The difference is bought from the grid.

Z3: Solar production begins to ramp up. Production from the solar panels and the alternative source is not sufficient to meet demand. Solar and the alternative source are used at full capacity. The balance is purchased from the grid.

Z4: Demand is met fully from the solar panels and the alternative source. There are no longer purchases from the grid. Sales to the grid begin.

Z5: The price from the grid drops so that it is no longer economical to use the alternative power source. Production from the solar panels is not sufficient to meet demand, so there are some minor purchases from the grid.

Z6: Solar production now exceeds demands. The entire excess can be sold to the grid as the total excess is less than the capacity of the unit to return power to the grid.

Z7: All production is from solar. Sales to the grid are at the maximum capacity of the unit.

Z8: All production is from solar, and there is excess capacity to sell to the grid, but the excess is less than the maximum capacity of the unit.

Z9: Solar demand is not longer sufficient to meet demand. Full demand could be met without purchases from the grid as both solar and the alternative sources are deployed. However, the marginal cost of the alternative source is greater than the price of electricity from the grid, so the difference between demand and solar production is made up through purchases from the grid. There are no sales to the grid even though there is sufficient onsite capacity, as it is not cost effective.

Z10: It is not possible to meet demand solely from the solar panels and the alternative power unit. Purchases from the grid are necessary. Sales are not possible. Solar power is used to the maximum possible extent, but the alternative power source is not used as it is not cost effective.

Z11: The price of power from the grid increases to the point where it is cost effective to deploy the alternative power source. As demand exceeds solar production plus the maximum capacity of the alternative source, the alternative source is run at full capacity. The balance is purchased from the grid.

Z12: Solar production drops to zero. The alternative power source is run at capacity. The balance of demand is met with purchases from the grid.

Z13: The price of power from the grid is lower than the marginal cost of production from alternative source A. All power is purchased from the grid.

The following table summarizes the above modes and decision-making points:

| Zone | Grid Purchases | Production from Solar Panels | Production from Alternative Source |
|------|----------------|------------------------------|-------------------------------------|
| Z1   | Yes            |                              |                                     |
| Z2   | Yes            |                              | Yes                                 |
| Z3   | Yes            | Yes                          | Yes                                 |
| Z4   |                | Yes                          | Yes                                 |
| Z5   | Yes            | Yes                          |                                     |
| Z6   |                |                              | Yes                                 |
| Z7   |                |                              | Yes                                 |
| Z8   |                |                              | Yes                                 |
| Z9   | Yes            |                              | Yes                                 |
| Z10  | Yes            |                              | Yes                                 |
| Z11  | Yes            | Yes                          | Yes                                 |
| Z12  | Yes            | Yes                          |                                     |
| Z13  | Yes            |                              |                                     |

Figure 9:
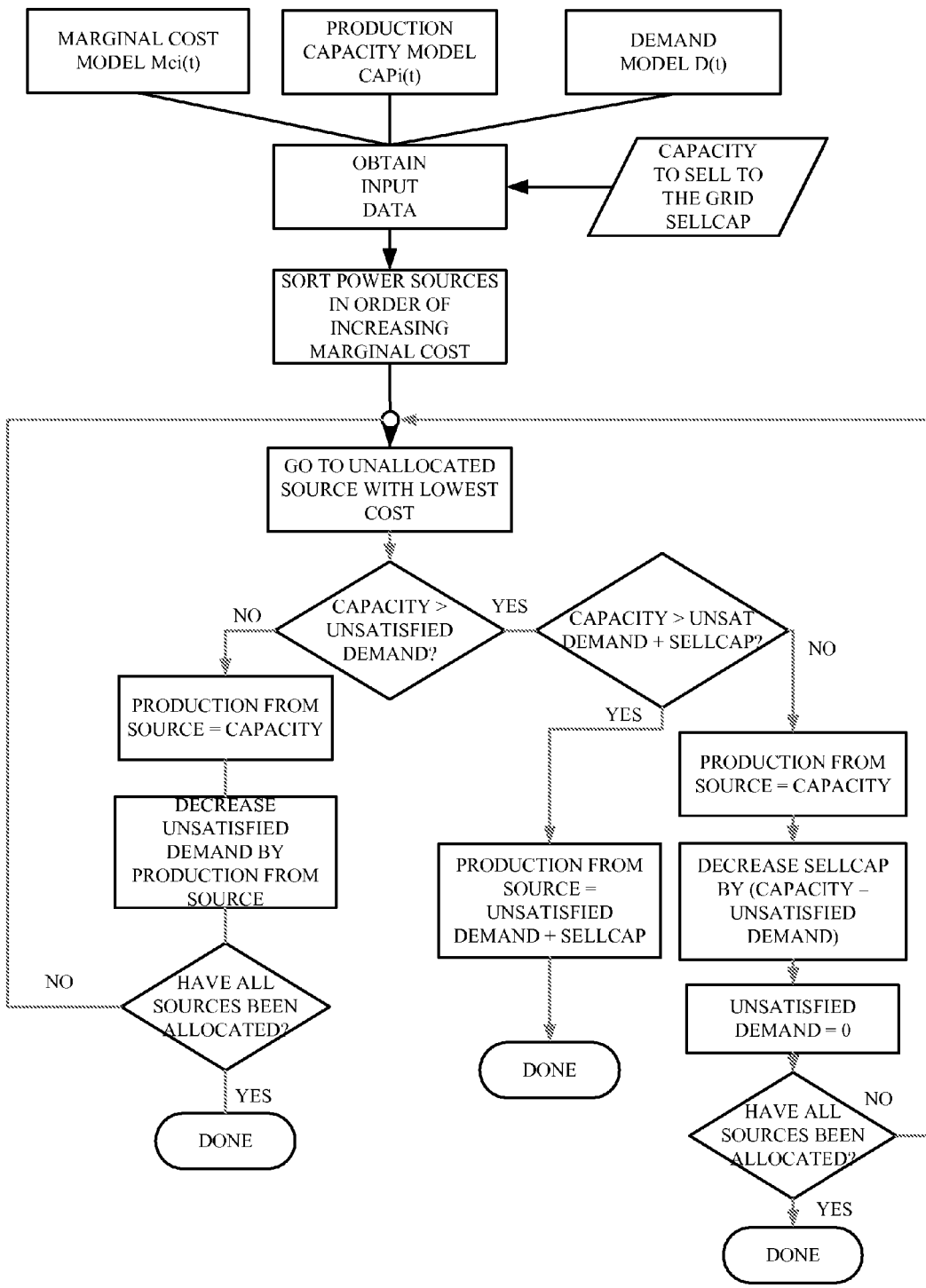
FIG. 9 shows in flow chart form one variation of an algorithm for least-cost determination according to various principles of the invention.

At any point in time, according to one variation of the invention, the controller performs an instantaneous calculation of comparative cost and selects the optimal order of dispatch. Essentially, the objective of the algorithm is to define the production from each source. One variation of this algorithm is described in the following pseudo code:

FIG. 9 shows this process graphically in flow chart form.

The case discussed to this point pertains where the marginal cost of production from a source is not a function of the capacity drawn from that source. This is the case, for example, with the grid (in the absence of demand charges)

```
j,k,m = arbitrary counters
t = current time (arbitrary serial time measure)
ns = number of sources of power (unitless)
MCs(t) = marginal cost of source s at time t (cents per kWh)
CAPs(t) = capacity of source s at time t (kW)
Let s = 0 represent the grid
MCo(t) = rate per kWh prevailing at time t (cents per kWh)
CAPo(t) >> demand at time t (kW)
Let s = 1 represent solar
MC1(t) = 0 (i.e. the marginal cost of the solar system is zero (cents per kWh)
D(t) = aggregate demand at time t (kW)
SELLCAP = maximum rate at which power can be sold to the grid (kW)
UNSAT = demand not satisfied by currently committed capacity (kW)
ORDER = vector of index number (s) of sources in ascending order of cost at time t
PRODk = optimal production from source k (kW)
// initialize unsatisfied demand to total demand
UNSAT = D(t)
// initialize production from all sources to zero
FOR k = 1 TO ns
        PROD(k) = 0
NEXT k
// sort sources in ascending order of prices (using a simple sort algorithm)
        ORDER(1) = SOURCE NUMBER (s) OF LOWEST COST
        ORDER(2) = SOURCE NUMBER OF SECOND LOWEST COST
        Etc.
// allocate production from lowest cost to highest until demand is met
// loop through sources in ascending order while the amount of allocated power is not
// sufficient to meet demand (i.e. UNSAT > 0)
j = 0
DO WHILE UNSAT > 0
j = j + 1
        k = ORDER(j)
//      determine if this is the marginal source
//      (i.e. the most expensive one necessary to meet demand)
IF (UNSAT>CAPk(t)) THEN
//      not the marginal producer
                PROD(k) = CAPk(t))
                UNSAT = UNSAT – PRODUCTION(k)
        ELSE
//      this is the marginal producer
//      determine if it is cost effective to sell or not by comparing to the cost of the
grid
        IF MCk(t) < MCo(t) THEN
//              You can sell from this unit. There are two cases:
                IF CAPk(t) > UNSAT + SELLCAP THEN
//                      Case 1: the maximum capacity of the marginal unit (k) is
// sufficient to meet demand and sell the power at the maximum capacity of the unit
                PROD(k) = UNSAT + SELLCAP
                UNSAT = 0
                SELLCAP = 0
        ELSE
//              Case 2: you can sell the full capacity of this unit.
                PROD(k) = CAPk(t)
                SELLCAP = SELLCAP – (CAPk(t) – UNSAT)
                UNSAT = 0
//              Determine if there is an unallocated source that is not needed
//              to meet demand, but which can sell power effectively
                IF j < ns THEN
                FOR m = j + 1 to ns
                        k = ORDER(m)
                IF MCk(t) < MCo(t) Then
//marginal cost of this source is less than the grid price, so
// power can be sold
                        PROD(k) = MAXIMUM(CAPk(t),SELLCAP)
                        SELLCAP = SELLCAP – PROD(k)
                ENDIF
        END FOR
     END IF
END WHILE
``` and photovoltaic panels (where the marginal cost is approximately zero) and so will pertain in many situations.

In some cases, however, the controller may be used to control sources where the cost does vary with capacity. In diesel generators, for example efficiency (and, hence, cost per kWh) varies with speed of operation. This is generally true of mechanical devices. This section describes a family of approaches to the determination of the least cost dispatch in the cases where cost per kWh is a function of kWh from a source. This general solution will work in the case where price is constant, but the calculation may be substantially more difficult and time consuming. Given the limited computational power that may exist in the controller and the need to keep that capacity available for safety monitoring, communications, and other functions, it may be useful to implement both the general and simpler (special case) algorithm and to use the simpler one when appropriate.

The general problem to be solved in least cost dispatch is to minimize the cost of production necessary to meet demand. In the case where marginal cost is a function of production from a unit, this objective is stated as follows:

$$\text{Minimize} \sum_{i=1}^{ns} \left( \int_{0}^{prod_i(t)} MC_i(x,t) dx \right)$$

where x=amount of power drawn from a source
Such that:

$$\sum_{i=1}^{ns} prod_i(t) = D(t).$$

This is the same problem as stated for the basic case, except that marginal cost (MC) is now a function of production from the technology.

Within the general problem of dispatch with production-variant marginal cost, there is one special case which can also be solved by a simple means. This is the case where cost is non-decreasing over any interval from zero to the capacity of the unit for each dispatchable unit.

Figure 14:
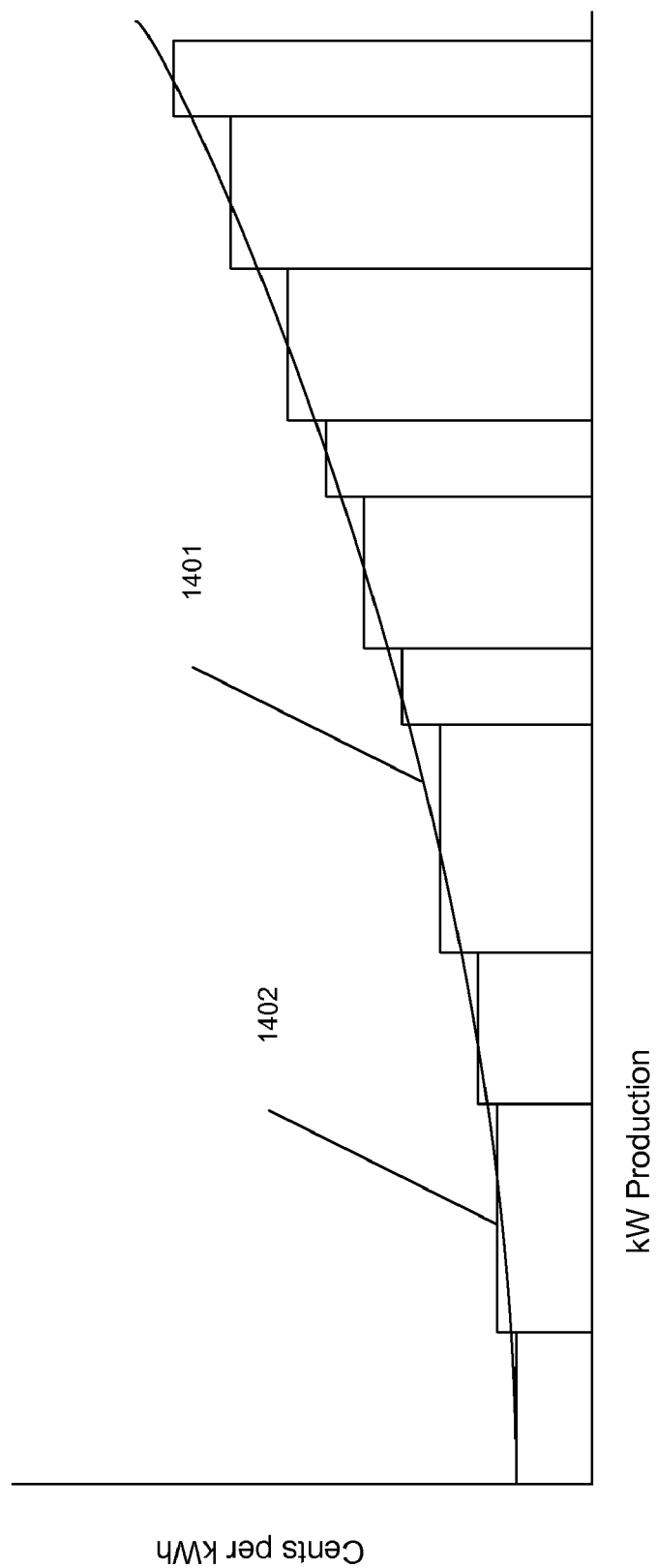
FIG. 14 shows the piecewise constant approximation of a monotonic cost of production curve.

FIG. 14 shows a common exponential production cost curve (1401). This curve can be approximated by a series of ranges within each of which cost is assumed to be constant. (1402). These ranges can be defined by several means. The simplest is to define the regions with a fixed width—spanning, say, 100-watt intervals (0-100 watts, 100-200 watts, etc.). An alternative is to create irregular intervals to reflect that there is greater change in some areas of the curve than others. Narrower zones are used where the production curve is steepest. This latter approach may be preferred in that it yields greater accuracy in cost estimation for the same number of ranges. Equivalent or better accuracy can, of course, be achieved by using more (narrower) ranges, but at a penalty in the speed of calculation.

For use in the least cost dispatch calculation, the correct constant value to use for an interval is the one which gives the same total cost as the accurate curve. This is given by:

$$AVGCOSTi = (1/(PMax_i - PMax_{i-1})) \int_{PMax_{i-1}}^{PMax_i} MCi(x,t) dx$$

Where:
$AVGCOST_i$=the average marginal cost to be used for interval i
$PMax_i$=the upper bound of the interval
$PMax_o$=0
$MCi(x,t)$=marginal cost of source Note that this average cost pertains only at time t, since the least cost dispatch problem is solved for a specific time. Different solutions pertain at different times. The subscript t is not included in this notation as it is implicit.

In the special case (as illustrated in FIG. 14) where cost is increasing, the least cost dispatch solution can be obtained using precisely the same algorithm as for the constant price case previously presented by treating each range as a virtual alternative source. The increasing price ensures that the ranges will be dispatched in order. In the event that the curve is not continually increasing, but simply non-decreasing (i.e. there is a range over which the marginal cost is constant), it is logical to include this entirely within a range, to avoid the risk that there would be two ranges (or virtual sources) with the same prices that might be dispatched in the incorrect order.

Figure 15:
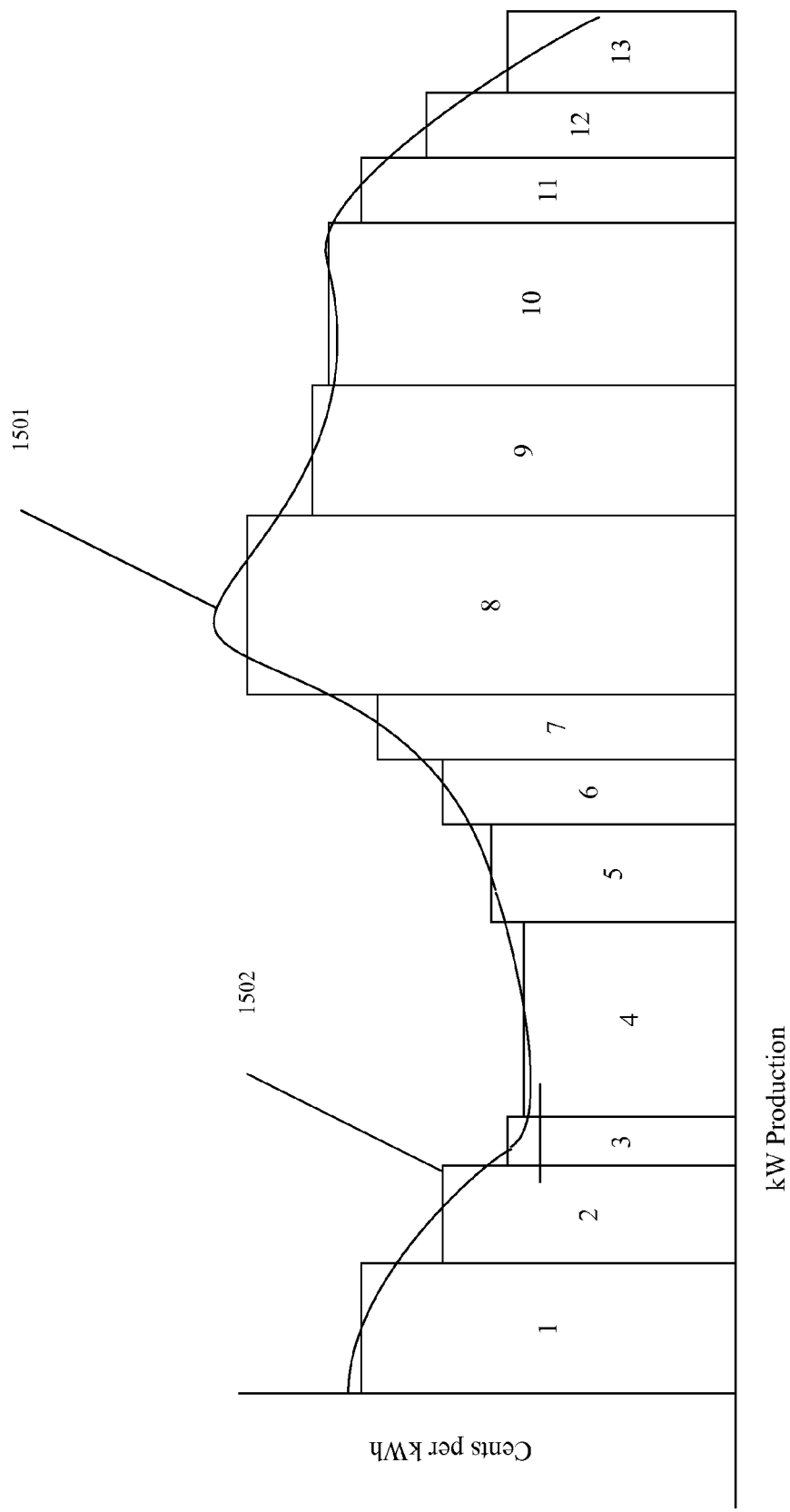
FIG. 15 shows the piecewise constant approximation of a non-monotonic cost of production curve.

The most general case involves a non-monotonic marginal cost curve—that is, a curve in which the first derivative of the curve is neither always non-increasing or always non-decreasing. This is illustrated in FIG. 15, which shows the actual production curve (1501) and a piecewise constant approximation (1502). In this figure the zones are numbered to support the discussion which follows. In this case, the algorithm specified for the fixed-cost case would choose to dispatch zone 4 first, followed by 3, 5, 13, 6, 2, etc. in that order. Clearly this is not possible from a physical perspective. One cannot commit the power from a zone (i.e. dispatch the zone) until the prior zone has been committed. Simply, this technology is most efficient when producing at the level comprising zone 4. One does not have the option of producing a very small amount (i.e. zone 1 or zone 2) at the cost of zone 4. To solve the problem one variation of the model which follows treats each zone as a logical separate source, which can only be dispatched in ascending order.

Though the fixed-cost case cannot be used, the problem can be formulated into a binary integer program of modest scale. The starting assumption is that the production (marginal cost) curve can be decomposed into a number of zones. This is done for both the constant cost sources (e.g. the grid and solar at a point in time t) as for the sources for which the marginal cost is not constant with level of production, whether these are monotonic or not.

The second of the three stages of the optimization (following the least-cost dispatch) is to manage the electrical loads in the home or business. The concept of using computers or microprocessors to manage electrical loads is not new, but the invention offers innovation in several areas, described below.

Conventional load management is done in two ways—at the point of use and by means of a central controller. Point-of-use technologies most commonly address lights and HVAC equipment. Lighting controls couple the lights to occupancy sensors which turn on the light when the room is occupied and off after a user specified time period when the room is not occupied. In some installations a switch is installed in series between the sensor and the lamp so that the light turns on only when occupancy is detected and the switch is in the on position. This prevents the light from being used when the occupant feels that there is sufficient light from other sources. This is simple, reliable, and commonly deployed technology. Use of the invention does not preclude this sort of controlled light.

HVAC equipment is controlled by a thermostat. A thermostat consists of three components—a temperature sensor, a mechanism for turning the connected HVAC component on when temperature is out of range, and a user interface of some kind. In simple, older thermostats, the temperature was a bimetallic strip that curved increasingly as the temperature rose. This bimetallic switch composed on contact of a simple contact switch that comprised the on/off control mechanism. The user interface was a simple rotating knob that moved the location of the bimetallic strip so that a greater or lesser curve was necessary to close the contact. This generation of technology was simple to use and cheap and effective in regulating temperature, but required manual intervention to adjust the set-point to reflect different user preferences for factors such as time of day or vacation.

Common thermostats of more recent design incorporate a processor so that users can program the preferred temperature by time of day and day of week. These offer improved performance but have several basic flaws: (1) the classification of daily patterns into weekend and weekday is too simplistic; (2) the system does not automatically compensate for deviations from the patterns, such as on holidays, vacations, or days when a person must stay home from work; (3) in installations where there are multiple zones with individual thermostats, there is unnecessary duplication of the processor, since a single processor could easily manage multiple zones; (4) when there are multiple thermostats they are unconnected to the others and operates independently, the user interface on the thermostat is very poor in comparison to the web-based application interfaces; (5) thermostats cannot be controlled remotely.

A more advanced generation of control systems has emerged to address these problems and to provide more advanced control. These are home automation controllers (HACs) such as those offered by Smarthome™ and Control4™. HACs are typically multi-function devices, providing functionality in one or more of four areas: entertainment, premises security, communications and networking, and environmental control which includes lighting and HVAC. This generation of controller provides a superior user interface typically using a CRT or LCD monitor (sometimes compact) and keyboard or custom keypad, and a single controller which can manage multiple zones and end-use functions. The more powerful processor and better interface allows for more complex configuration of usage patterns.

To date, however, environmental control has been the least developed of the HAC control functions. HAC development has focused first on management of entertainment systems including whole-home audio and video and home theatre. Variants of the invention, by means of integrated supply side and storage technology and advanced algorithms, provide superior energy management.

Least-cost dispatching is the first step in advanced control. The second step is management of deferrable loads. The total demand is made up of multiple small components. Some of these can be deferred or accelerated. That is, the service they supply can be rescheduled to reduce energy costs. In some cases this simply changes the time at which the energy is used. In other cases it can reduce the total amount of energy used. Some examples include:

Dishwashing: Dishes can be loaded for washing at a future time, up to the time when the dishes are needed less the cycle time. Energy use is roughly the same whether dishes are washed immediately or later.

Clothes washing: Clothes washers and dryers, like dishwashers, are similarly deferrable. In the case of dryers it is sometimes advantageous from a quality of service perspective to delay the start so that the cycle finishes when someone is there to empty the dryer.

Hot Water Heaters: Hot water heaters are typically designed to maintain water at a constant high temperature. Energy is lost from the system in two basic ways—through the use of hot water and standing losses, which are losses that occur when water is not being used. Standing losses occur though the shell of the hot water heater itself and from the hot water in the pipes throughout the premise. Since the ramp up in energy prices in the 1970s the insulation of the hot water heaters has been improved substantially, until the losses are much smaller than was previously the norm.

Hot water pipes, however, are not typically insulated. In a model household, the demand for hot water drops off when everyone is done with their morning showers, except for some latent dishwashing or clothes washing. Thus, demand is essentially zero during the day. Shutting off hot water heating when there is no demand is useful for reducing instantaneous demand, but can also reduce total energy consumption. The energy savings are due to the nonlinear nature of heat loss. Roughly, the rate of heat loss from a warm body is a function of the third power of the temperature—the standing losses are higher when the temperature is higher. Allowing the water to cool reduces the rate of heat loss. Hence, less energy is used to heat water later when it is needed than to heat it immediately and then keep it warm for hours. The method for optimally scheduling loads that need not be executed at a specific time is described below.

Refrigerators: Refrigerators are not typically useful from the perspective of energy demand management. A more or less constant low temperature is essential for preserving food safely and maintaining its quality. As in the dishwasher, there are losses when the refrigerator is used (i.e. the door is opened) as well as standing losses even when the refrigerator is not being used. In the case of refrigerators, it is imperative that the temperature be returned to the set point as quickly as possible when heat is allowed to enter the cabinet. Thus, it is not possible to save energy by deferring the cooling. A refrigerator's total energy will be essentially the same regardless of the energy management system.

That said, however, the high quality insulation of a modem refrigerator makes it possible to defer load for modest periods (on the order of 15 minutes) while in temperature maintenance mode without adversely affecting the interior temperature. This is useful for load management if not for energy management.

Figure 10:
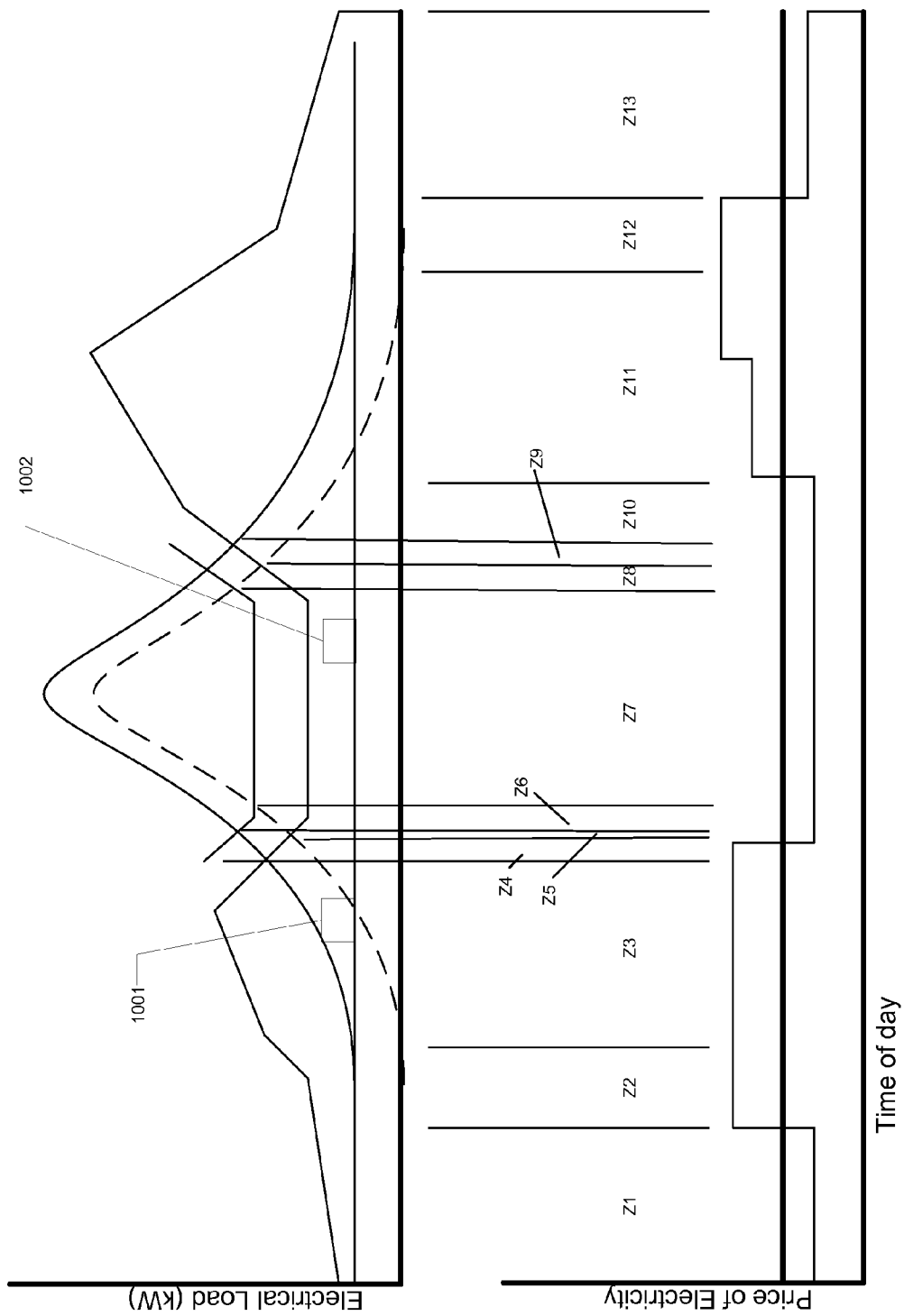
FIG. 10 shows how a deferrable load can be shifted from a high-cost period (zone 3) to a lower-cost period (zone 7).

FIG. 10 shows the energy and load impact of deferring energy use from these controllable loads. FIG. 10 shows an energy process (e.g. dish washing) which is initiated in the morning. Here "initiated" refers to setting up for execution during a specified time interval. The energy required to execute the process is the integral of the load (power) shown on the vertical access over the time interval of the process.

In FIG. 10, element 1001 is the originally scheduled time for a service (e.g., washing the breakfast dishes). This is a relatively expensive time, as utility rates are high and solar production is low. Element 1002 is a better time—solar production exceeds the ability to sell to the grid, so the marginal value of the power is zero. Performing the service in zone 7 gets it done at no cost, but still in time for the family's arrival home after work.

During the configuration process, parameters can be established for various daily profiles and for the end-use technologies. The end-use technology profile specifies what can be controlled and how, as previously described. The daily profile describes the preferred set-point for each technology over the course of the day, such as the temperature. For deferrable loads, the configuration specifies when the service must be available. For example, the specification for the hot water heater may require that hot water be available at 0730 for the morning wakeup and at 1800, while the dishwasher must have finished running by 0730 or 1700. Given these parameters, according to the invention the optimal time to execute the process can be determined.

Figure 11:
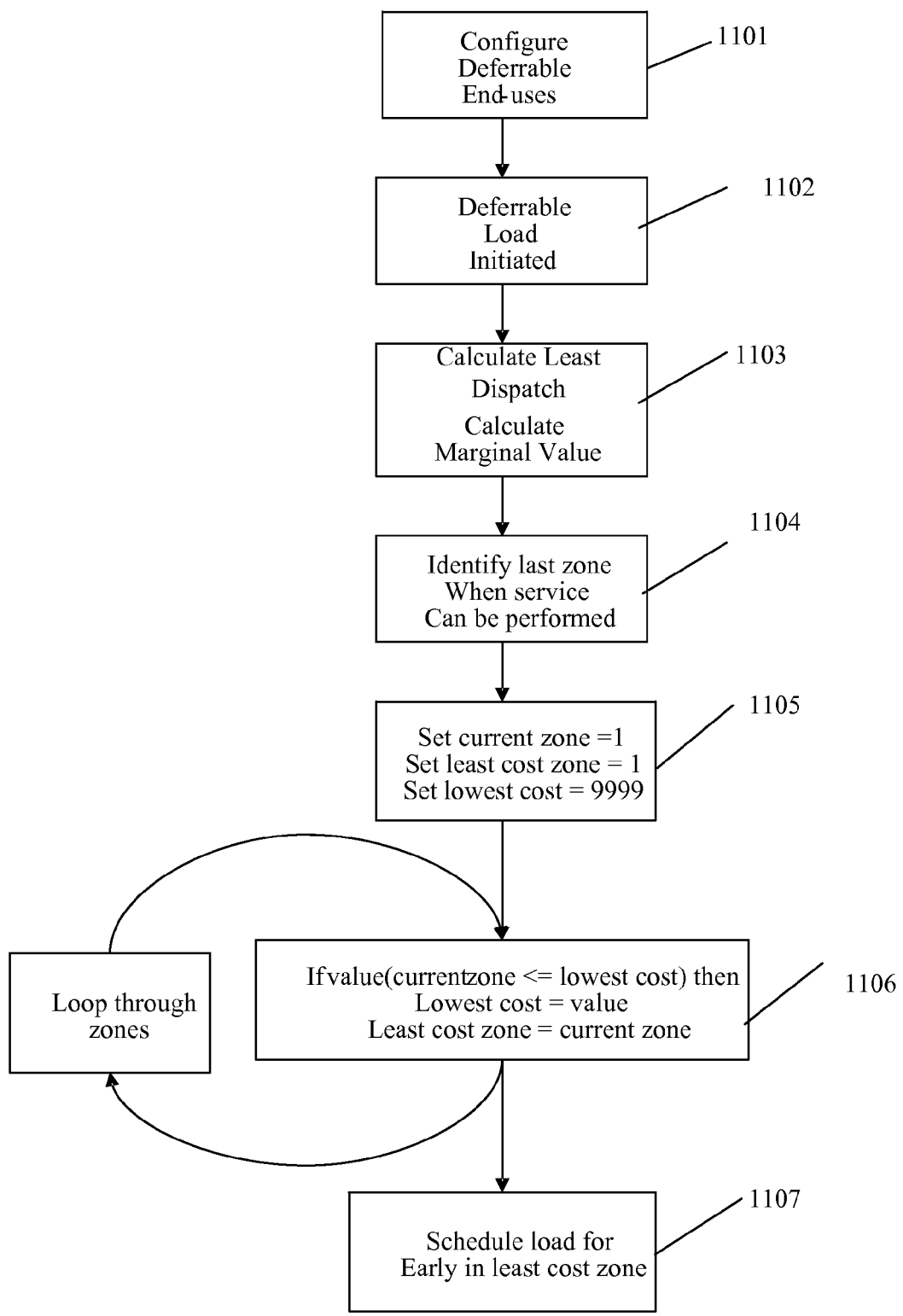
FIG. 11 shows a process for least-cost dispatch calculation.

This determination rests on the least cost dispatch calculation and, hence, is outside the capability of the HAC systems other than the invention. The method of this variation of the invention is shown in FIG. 11. The least cost dispatch calculation determines the marginal value of electric power as a function of the time of day as described previously. The management of deferrable loads begins with the configuration of deferrable loads (1101). In this step, the user of the system or the installer defines which loads (e.g. dishwashing, refrigeration) can be deferred and under what circumstances. For example, the rule can be established that there should be no pending dishwashing at 0700 and 1700, meaning that the dishes must be clean before breakfast and before dinner. The rule for refrigeration could be that it must operate at least three hours out of every four. The rule for freezers could be that it can be shut down for two hours at a time. The actual management process is initiated when a deferrable load is initiated (i.e. scheduled for service) (step 1102). The least cost dispatch model is rerun (step 1103). This, as described previously, divides the forecast period into zones (1 to n) and calculates the marginal value of electricity in each.

Figure 12:
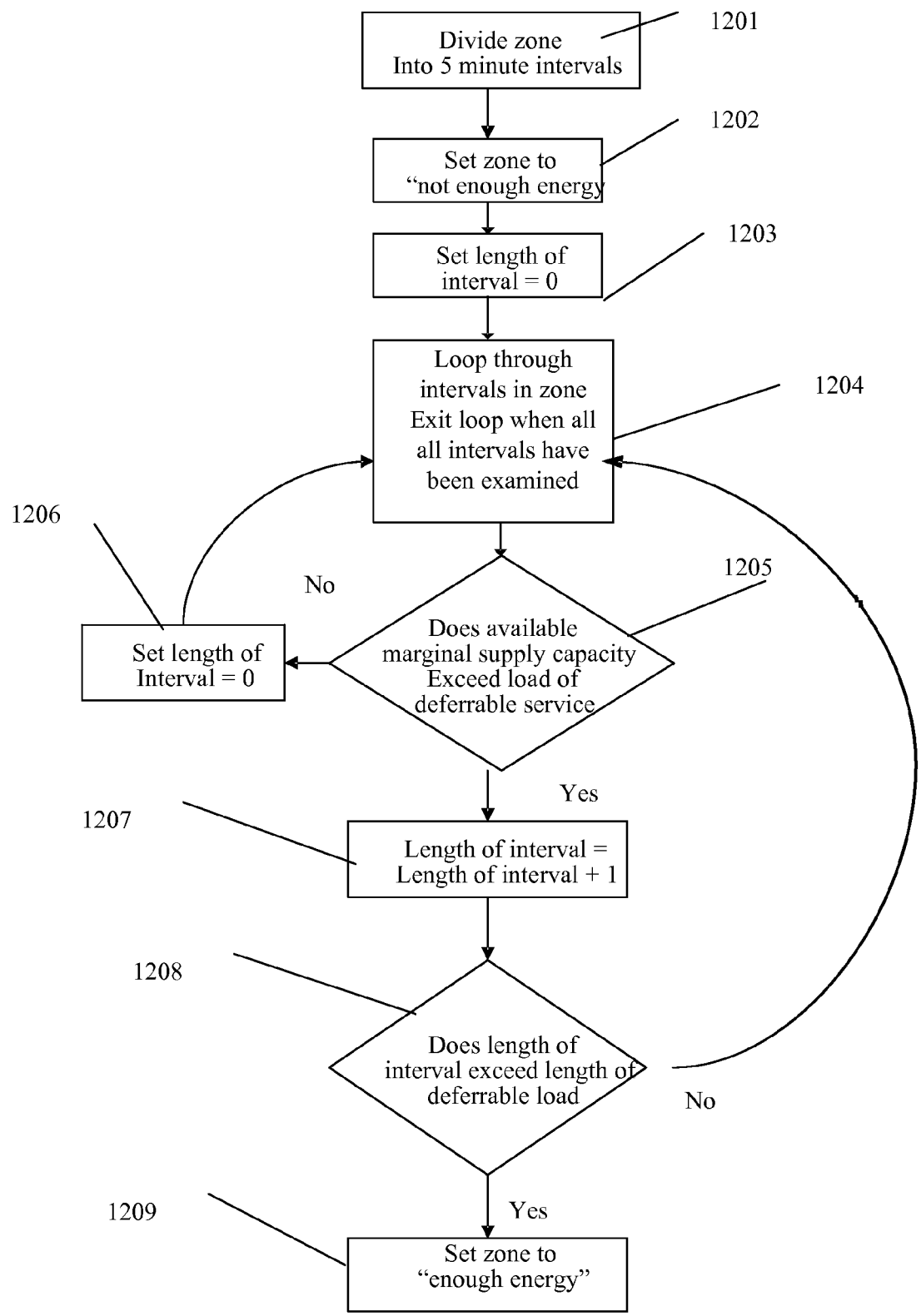
FIG. 12 shows a process for determining whether a deferrable load can be serviced in a zone.

The calculation then determines which zones are candidates for the deferrable service (1104). This is a two step process. First, there is a simple calculation to determine which zones occur before the deferrable load must be completed. Then, it is determined whether there is sufficient power in that zone to complete the service. There are two elements to this determination—the power determination and the energy determination. Power is the instantaneous difference between the baseline demand (i.e. without the deferred load) and the power available in the zone without exceeding the capacity of the marginal supply (termed "available marginal supply capacity"). Exceeding the capacity of the marginal supply would increase the marginal cost of supply and potentially the marginal value. The second part is to determine where there is sufficient energy to deliver the service. Energy is the integral of power over time, so this determination involves integrating the available marginal supply capacity over a contiguous interval when this capacity exceeds the demand of the deferrable load. This method is shown in FIG. 12.

The determination of whether a deferrable load can be serviced in a zone is essentially a determination of whether there is an interval in that zone during which there is sufficient marginal supply capacity to meet the deferrable load. The actual load may vary by instant, but for this calculation it is sufficient to approximate it by a piecewise constant function comprised of short intervals. Five minutes is sufficient. The process for determining whether there is sufficient marginal power in a zone to supply a deferrable demand begins with dividing the zone into these short intervals (step 1201). The available marginal supply capacity (AMCS) in each interval is calculated (step 1202). The system then steps through the intervals in order to find a contiguous period during which the AMCS is, at all instances, greater than the approximated load of the deferred services.

This determination begins by setting the hypothesis that there is enough energy to "not enough energy" and the length of the contiguous set of intervals under test to 0 (steps 1202, 1203). Then, for the intervals in order, the system tests whether the AMCS is greater than or equal to the load of the deferred service (step 1205). If not, the length of the interval under test is set to zero (step 1206) and the search continues though the remainder of the zone. If there is sufficient capacity (AMCS>deferrable load), the length of the interval set is increased by 1 (step 1207). At this point the method determines whether the entire deferrable load requirement has been met (i.e. the length of the interval set is greater than or equal to the duration of the deferrable load) (step 1208). If not, the next interval is tested. If so, then the hypothesis that there is sufficient energy is set to "enough energy" (step 1209) and the method ends with the determination that the deferrable load can be scheduled for the zone under test.

If it is determined that there is more than one zone when the services can be performed, the system calculates when the services can be performed at the lowest cost. This is done by looping through the candidate zones (1105) and (1106). At the completion of the process, the deferrable load is scheduled for execution. That is, the current on the deferrable load's circuit is shut off until the start of the zone determined to be the lowest cost (step 1107).

If there is no zone which has sufficient energy available to perform the deferred service without impacting the dispatch calculation, it is necessary to accept that the service must be performed at a higher cost. In this case, the new cost is calculated by incrementing demand in each zone before the scheduled time of delivery by an amount necessary to meet the deferrable demand, and then repeating the least cost dispatch calculation. The preferred zone to perform the service is the one where the marginal cost is lowest.

The third aspect of the optimization is the determination of when to buy or sell power from the grid. Sales to the grid can be made in three different ways—(1) the meter can be run in reverse, essentially selling power back at the prevailing retail price, (2) when utilities declare an emergency, power can be sold under an established demand response program, and (3) power can be sold in the wholesale power market.

Effective management of the buy/sell decision can be based on the arbitrage algorithm discussed below. This calculation builds on the least cost dispatch algorithm, and should be executed after the deferrable loads have been scheduled.

Variants of the invention include three capabilities for optimal energy management—(1) optimal (least-cost) dispatching of multiple supplies, (2) management of demand side resources, and (3) use of storage. This section addresses how storage can be deployed optimally. Storage can take multiple forms, including batteries (including but not limited to lead acid and nickel metal hydride), large capacitors (sometimes called supercap), mechanical storage in the form of a flywheel, and compressed air. The invention is designed to work with any form of storage or multiple forms of storage in a single installation. The specific form of storage is not critical, nor is storage technology an aspect of the invention.

The value of storage technology is manifest: (1) storage provides emergency backup when supply from the grid is interrupted; (2) storage buffers the difference between demand at an instant in the supply from variant sources like photovoltaics and wind, allowing them to be used when there is no grid connection; (3) storage extends the period of usefulness of technologies like solar and wind which show large variation in production over the course of the day; (4) where the cost of a supply varies over the course of the day (as in the case of time of day rates) storage provides for shifting demand from time of high cost to low cost; (5) storage can provide for the mitigation of "demand charges" which are based on peak consumption, possibly to the extent necessary to move to a lower cost contract; and (6) in sufficient quantity (as from multiple units (100's or 1000's) energy for and from storage can be traded on the wholesale market allowing for arbitraging.

For simplicity of notation, "buying" storage refers to putting energy into storage from any source, and "selling" storage as discharging from storage to meet demand, sell to the grid, sell on the wholesale market, or transfer to another form or storage.

As the invention specifically addresses management of electricity, the logical unit for measuring storage is Amp hours (Ah) at the voltage of service, which can be 120V, 220V split phase, 208 3 phase, or 240 2-wire for foreign installations. The capacity and current storage of mechanical technologies are not naturally measured in Amp hours, but in units such as Newton meters for flywheels or liters at a pressure given in kilopascals for compressed air. These, however, can be converted to the equivalent Amp hours by a simple engineering calculation accounting for the efficiency of the generator. The following pseudocode provides one example of the method of calculation:

Nt=number of technologies
Nz=number of "zones" of uniform value as shown in FIG. 10
Vk=the value of power in zone k. The value of power is the marginal cost of power in a zone from the least-cost dispatch calculation except in two cases—(1) where power is being sold, at which point the value is the sales price, and (2) where there is excess power from an alternative source than can neither be sold or stored, in which case the value is zero.

| | |
|---|---|
| SCi = | Storage capacity of technology i |
| SSi,j = | storage sold from technology i in time interval j |
| SBi,j = | storage bought for technology i in time interval j |
| Cij = | energy stored in technology i at end of time interval j |
| Cio = | energy stored in technology I at start of planning period |

Revenue in any time interval i is given by:

$$R = \sum_{j=1}^{nt} \sum_{k=1}^{nz} (SSkj - SBkj)Vk \quad \text{(eq. 1)}$$

The objective is to maximize revenue as given above, subject to the standard non-negativity constraint necessary to solution of a linear program:

$$SSij \geq 0 \, \forall i,j$$

$$SBij \geq 0 \, \forall i,j \quad \text{(eq. 2)}$$

Additionally, there are the obvious physical constraints that one cannot "buy" more storage than there is unused capacity or sell more storage than there is currently stored. As defined, the storage at the start of period 1 for technology i is Cio. The charge at the end of the period is given by:

$$C_{i1} = C_{i0} + SB_{i1} - SS_{i1}$$

$$C_{i2} = C_{i1} + SB_{i2} - SS_{i2} = C_{i0} + SB_{i1} - SS_{i1} + SB_{i2} - SS_{i2}$$

$$C_{i3} = C_{i3} + SB_{i3} - SS_{i3} = C_{i0} + SB_{i1} - SS_{i1} + SB_{i2} - SS_{i2} + SB_{i3} - SS_{i3}$$

. . .

Generally, $$Cin = Cio + \sum_{j=1}^{n-1} (SBij - SSij) \quad \text{(eq. 3)}$$

The constraint on not buying more than the capacity allows is given by:

$$SB_{in} \leq SC_i - C_{in-1} \, \forall i,n$$

$$SB_{i1} \leq SC_i - C_{i0} \quad \text{(eq. 4)}$$

$$SB_{in} \leq SC_i - \left(C_{i0} + \sum_{j=1}^{n-1} (SBij - SSij)\right) \forall n \geq 2 \quad \text{(eq. 5)}$$

Equation 4 is in standard form for a linear program. Equation 5 is put in standard form simply by rearranging terms:

$$SB_{in} - \sum_{j=1}^{n-1} SBij + \sum_{j=1}^{n-1} SSij \leq SC_i - C_{i0} \quad \text{(eq. 5a)}$$

The constraints on not selling more than is stored are stated as follows:

$$SS_{i,m} \leq C_{i,m-1} \, \forall i,m$$

$$SS_{i,1} \leq C_{i0} \quad \text{(eq. 6)}$$

$$SSim \leq \left(C_{i0} + \sum_{j=1}^{m-1} (SBij - SSij)\right) \forall n \geq 2 \quad \text{(eq. 7)}$$

As for the earlier constraints, equation 6 is in standard form and equation 7 is readily transformed:

$$SSin - \sum_{j=1}^{n-1} SBij + \sum_{j=1}^{n-1} SSij \leq C_{i0} \quad \text{(eq. 7a)}$$

Solution of this LP by standard means (e.g. the Simplex Algorithm) is not difficult, but, as had been emphasized previously, this calculation must be repeated frequently on a small processor. Hence, there may be an advantage in simplifying the calculation to the maximum possible extent. These observations assist in simplifying the calculation:

Principle 1: Since the value of energy is constant in any period, if it makes sense to buy storage, the system will buy the maximum amount possible.

Principle 2: Similarly, if it makes sense to sell storage, the system will sell the maximum amount possible.

Principle 3: It will never make sense to both buy and sell in one period.

Together, the first two observations transform the problem from a general linear programming problem into the special form of a binary integer program.

Let:
XSi,j=1 if capacity is sold from technology i in period j and 0 otherwise $XB_{i,j}=1$ if capacity is bought for technology i in period j and 0 otherwise The objective function now becomes $$\text{Maximize } R = \sum_{j=1}^{nt} \sum_{i=1}^{nz} (XS_{ij}SS_{ij} - XB_{ij}SB_{ij})V_i \quad \text{(eq. 8)}$$

Where $SS_{ij}$ and $SB_{ij}$ are constants calculated as follows:

$$SS_{in} = C_{i,n-1}$$

$$SB_{in} = SC_i - C_{i,n-1} \quad \text{(eq. 9)}$$

Where $C_{i,n}$ are still calculated as in equation 3.
The constraints are rewritten as follows:

$$SB_{in} - \sum_{j=1}^{n-1} SB_{ij} + \sum_{j=1}^{n-1} SS_{ij} \leq SC_i - C_{i0} \text{ becomes} \quad \text{(eq. 5a)}$$

$$XB_{in}SB_{in} - \sum_{j=1}^{n-1} XB_{ij}SB_{ij} + \sum_{j=1}^{n-1} XS_{ij}SS_{ij} \leq SC_i - C_{i0} \quad \text{(eq. 5b)}$$

$$SS_{in} - \sum_{j=1}^{n-1} SB_{ij} + \sum_{j=1}^{n-1} SS_{ij} \leq C_{i0} \text{ becomes} \quad \text{(eq. 7a)}$$

$$XB_{in}SS_{in} - \sum_{j=1}^{n-1} XB_{ij}SB_{ij} + \sum_{j=1}^{n-1} XS_{ij}SS_{ij} \leq C_{i0} \quad \text{(eq. 7b)}$$

This formulation is the simplest one. It assumes a perfect storage in which energy can be stored and retrieved without loss or any cost other than the cost of the energy. This is not a realistic case, but the explanation is clearer without these additional complications and the formulation is precisely the same. There are two factors to consider. The first is that not all of the power purchased can be stored with perfect efficiency.

The simplest method to address this is to add an efficiency term to the objective function, which provides for less revenue when power is sold. This term (eff) is less than 1 and is a linear approximation of average energy lost in a buy/sell (charge/discharge) cycle. The objective function with an efficiency term is as follows:

$$\text{Maximize } R = \sum_{j=1}^{nt} \sum_{i=1}^{nz} (eff \times XS_{ij}SS_{ij} - XB_{ij}SB_{ij})V_i \quad \text{(eq. 10)}$$

The other factor to consider is that some forms of storage (notably batteries) lose capacity with repeated cycles and are limited in the number of cycles they can execute. These can be addressed by adjusting the objective function to include a cost of cycling as follows:

$$\text{Maximize } \sum_{j=1}^{nt} \sum_{i=1}^{nz} XS_{ij}(eff \times SS_{ij}V_i) - \quad \text{(Eq. 11)}$$

$$\sum_{j=1}^{nt} \sum_{i=1}^{nz} XB_{ij}(SB_{ij}V_i + CycleCost)$$

The constraints remain the same. CycleCost is the estimated cost of executing a cycle. $C_{i0}$ in equation 3 is replaced with $C_{io}'$, which is a function (determined, e.g., via experimentation and/or engineering data for a specific device) of the starting capacity, the number of cycles, and the total amount of energy stored. This is stated as follows:

$$C_{io}' = F\left(C_{io}, \sum_{t=0}^{\infty} \sum_{j=0}^{nz(t)} (XS_{ij}), \sum_{t=0}^{\infty} \sum_{j=0}^{nz(t)} (SB_{ij})\right) \quad \text{(Eq. 12)}$$

In equation 12 there are two summations over time from time=0 to time=infinity. These sums represent the history of the storage device. The sum of $X_{ij}$ represents the number of times the technology was used, as $XS_{ij}=1$ whenever power is added to the technology. The second double sum (of $SB_{ij}$) equals the amount of energy added to the device over its life since startup. $Nz(t)$ is the number of zone used in a cycle. This function is characteristic of a specific storage technology. It should be estimated from engineering principles and the design data for the specific device.

At this point the problem has been formulated as a relatively simple binary integer program with linear constraints. For the most common case where there is a single storage medium (e.g. batteries) and the forecasting period is limited to ten zones (1 to 1.5 days under most utility rate schedules), the problems is then limited to 20 zero/one variables (10 sell options and 10 buy options). Assuming that the optimum solution would not likely involve selling in the 3 zones with the lowest rates nor buying in the zones with the three highest rates, the problem size is reduced to 7 buy options and 7 sell options. Thus, in six of the 10 periods, there are only two options (do nothing and either buy or sell depending on whether it is a high value period or a low value period), while in the other four period there are, in theory, four options do nothing, buy only, sell only, and buy and sell. The last of these makes no sense, of course, so ¼ of the options need not evaluated, leaving only three. Thus, the total number of combinations is given by Number of combinations=$2^6 \times 3^4 = 5184$.

As the evaluation of an option involves only a few simple additions, the options can be quickly evaluated through simple enumeration. This case, while special, is in fact the most common as there are very few if any current installations with more than one form of storage.

For larger cases it may be necessary to solve the problem by the standard means of solving binary integer programming problems, as addressed in the section on least cost dispatch.

Referring again to FIG. 3, step 311 will now be explained in more detail (estimating the daily service profile). The daily service profile is an estimate of load over the course of the forecasting period. The forecasting period at a minimum should span the next 24 hours, but 48 hours may be better. The only barrier to the longer period is the processor time required to perform the longer forecast without impacting the basic safety monitoring function of the controller's processor. The size of the problem that must be solved at any installation for any period is determined by the number of load zones reflecting changes in the grid rate schedule or the relative rank of costs of the grid and alternative sources. More zones imply a larger optimization problem and exponentially longer solution time, potentially reducing the forecast period from 48 hours to the acceptable 24 hours.

Figure 13:
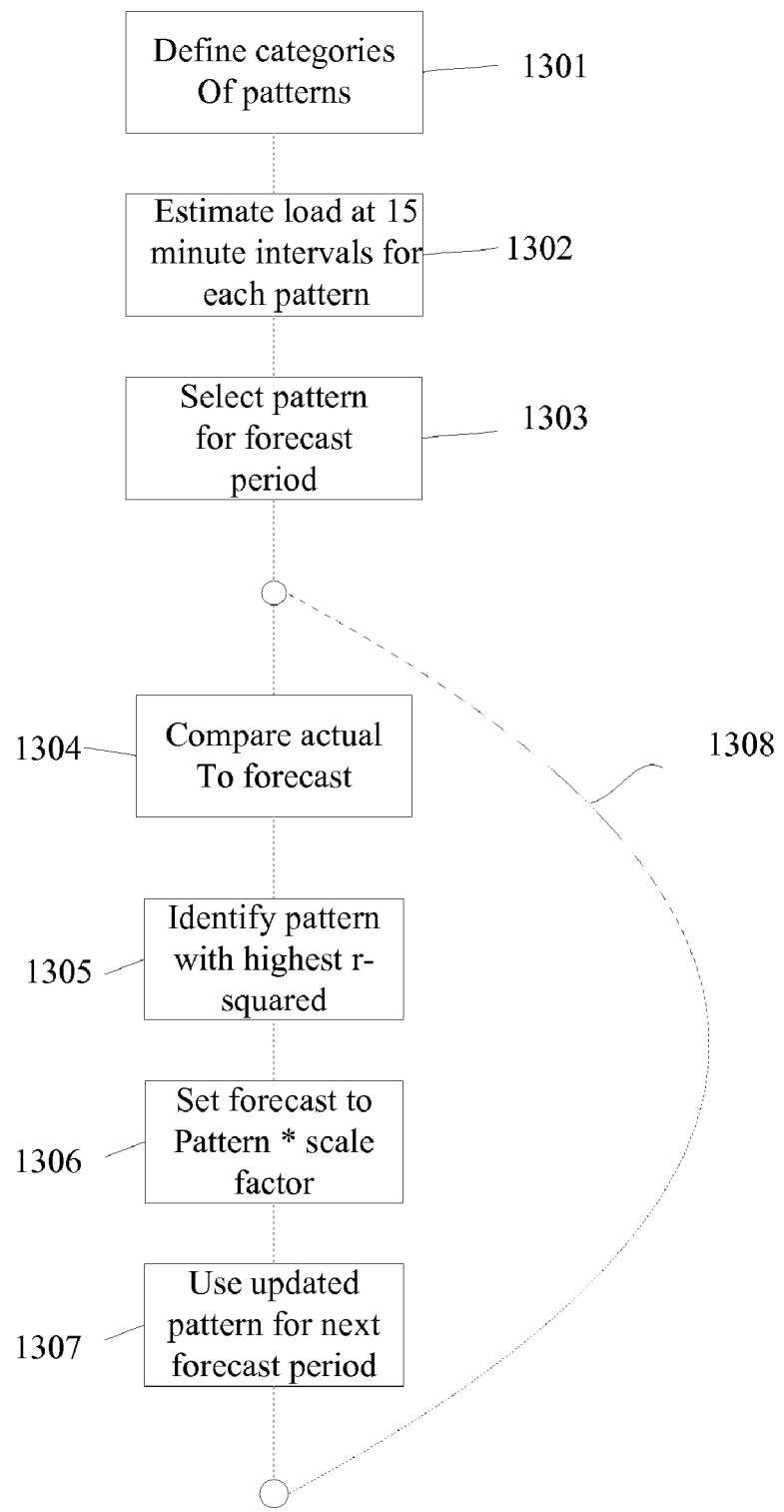
FIG. 13 shows a process for estimating a daily profile.

In preparing the daily service profile, demand (measured in kW) can be estimated at 15 minute intervals for the forecast period. There are two preferred methods for doing this. The first method is based on past usage patterns. This is shown in FIG. 13. The process begins with the specification of categories of patterns (1301). In a typical home or business, there are distinct differences between different kinds of days, such as weekdays or weekends, workdays or non-work days, vacation days, holidays, or other. In addition, patterns will be defined for sunny days, cloudy days, partly cloudy days, and rainy days. Using engineering principles, (e.g. a building energy model like DOE-2) an estimate can be made of the load for 15 minute intervals for the next 24 hours (step 1302). While this estimate should be as accurate as can readily be obtained, it is not critical that it be highly accurate, as the remainder of the process is directed at correcting this error.

The next step is to select a pattern for use for the next 24 hours (step 1303). If the day is a weekday and sunny, for example, a sunny weekday pattern should be elected. Again, however, the consequences of choosing a bad pattern at this point are not serious. At this point the routine re-estimation begins. This is shown by the loop (step 1308) which executes every 15 minutes or more frequently if new data are received from the network indicating a change in ambient conditions, utility rates, or other factors or there is a substantial change in the load at the house.

Every cycle, actual load for the past four hours is compared to the load from each available pattern. A correlation coefficient (r-squared) is calculated, (1304) and the best match is identified (1305). This pattern is then scaled up or down linearly to reflect the absolute level of energy use (1306) as described below. The final step is to update the pattern to reflect actual energy use (1307). A simple method for accomplishing this is described below. An alternative method is to use a Bayesian approximation.

The objective of this final step is to improve the fidelity of the patterns after the initial crude estimate, to accommodate changes in the premises, to incorporate longer term patterns in energy use (such as from climate or the degradation of HVAC equipment). Short-term changes as in the case of weather are integrated by re-estimation every 15 minutes or more frequently in response to changing conditions. Historically, one of the best predictions of a day's weather is to assume that it will be like yesterday, and the best prediction of the upcoming hour is the past hour. Obviously, however, weather does change. When forecast information is available, this can be transmitted from the control center (101) to the facility in the form of direction to use a specific pattern. In this way the forecast can accommodate predictions for rain, snow, clearing, or other weather patterns. One method for doing this is described below.

| Define | |
|---|---|
| Np | Number of patterns (e.g. weekday, weekend, vacation) |
| T | Time period in 15 minute intervals |
| | t = (−16 . . . −1) for the four hours prior to the current time |
| | t = 0 for the current time |
| | t = (1 . . . 96) for the next 24 hours |
| Lij | Load (kW) at time j using pattern i |
| ALj | Actual load (kW) at time j, j = (−16 . . . −1) (prior four hours) |
| PLj | Predicted load (kW) at time j, j = 1.96 (next 24 hours) |
| SF | Scale factor, which is the ratio of the energy actually used in the last four hours over the energy that would have been used had the selected pattern actually pertained |

Step 1: Identify the most accurate pattern. Calculate $r^2$ for ALj vs. Lij for all patterns i, for the past four hours (j=−16 . . . −1). $r^2$ is the standard goodness of fit measure, where r is given by=[Cov(AL,Li)]/[StdDev(AL)×StdDev(Li)]. Use pattern i which has the highest $r^2$.

Step 2: Scale the selected pattern to reflect actual use. Use pattern i which has the highest $r^2$. Estimate demand for the next 24 hours by scaling the selected pattern by the ratio of the actual absolute use of energy over the past four hours vs. the energy use as expressed in the selected pattern.

$$SF = \sum_{j=-16}^{-1} ALj \bigg/ \sum_{j=-16}^{-1} Lij$$

$PLj=SF \times Lij$ for j=(1 . . . 96)

Use this PLj as the forecasted for the next 24 hours.

Step 3: Update the Pattern. Adjust the pattern to reflect the difference between measured and projected for the last hour and the scale factor used for the forecast.

Lij=0.5*(Lij+ALj) for j=(−16 . . . −1)—past is average of actual and estimated

Lij=Lij*((SF+1)/2) for j=(1 . . . 96)—future is adjusted by having the scale factor estimate demand for the next 24 hours by scaling the selected pattern by the ratio of the actual absolute use of energy over the past four hours vs. the energy use as expressed in the selected pattern.

Any of the steps or modules described above may be provided in software and stored as computer-executable instructions on one or more computer-readable media. Numerals used in the appended claims are provided for clarity only and should not be interpreted to limit the order of any steps or elements recited in the claims.

What is claimed is:

1. A method for deferring demand for electrical energy, comprising the computer-implemented steps of:
   (1) automatically estimating a cost over a forecasting period for electrical energy at a location, wherein the forecasting period is divided into at least three zones, said zones delineating different modes of operation derived either from a change in the relative prices of multiple sources of energy or changes in demand relative to capacity of the multiple sources, and wherein the cost of electrical energy is estimated based on a forecast of demand for electrical energy in each zone;
   (2) determining a demand for electrical energy by one or more devices at the location for which energy consumption can be deferred;
   (3) identifying a zone of the at least three zones in which an available marginal power supply capacity is greater than an electrical load of at least one device of the one or more devices;
   (4) repeating step (3) to identify contiguous zones having a total duration exceeding a duration of time during which the at least one device is to be operated;
   (5) selecting a plurality of the identified contiguous zones as a lower-cost time period; and
   (6) automatically deferring electrical consumption for the at least one device from a higher-cost time period to the lower-cost time period, including the computer-implemented step of issuing a command to the at least one device to cause the deferral to occur.

2. The method of claim 1, wherein the available marginal power supply capacity represents a capacity of a non-grid-based power source.

3. The method of claim 2, wherein the available marginal power supply capacity represents a capacity of a photovoltaic power source.

4. The method of claim 1, wherein step (5) includes
(5a) identifying, from the at least three zones, a plurality of candidate intervals for selection as the lower-cost time period, and
(5b) selecting as the lower-cost time period the candidate interval resulting in the lowest cost.

5. The method of claim 1, wherein step (5) includes
(5a) determining that there is insufficient available marginal power supply capacity to provide the electrical load of the at least one device for an amount of time during which the at least one device is to be operated,
(5b) incrementing demand in each zone by an amount sufficient to provide the electrical load of the at least one device,
(5c) re-estimating the cost over the forecasting period for electrical energy based on the incremented demand in each zone, and
(5d) selecting the portion of the forecasting period having the lowest re-estimated cost as the lower-cost time period.

6. The method of claim 1, wherein the forecasting period is divided into at least three zones, and wherein step (5) includes
(5a) determining, using a configuration specifying temporal limits on deferral of operation of the at least one device, a candidate interval comprising zones of the at least three zones during which the at least one device may be operated,
(5b) repeating step (5a) so as to identify a plurality of candidate intervals for selection as the lower-cost time period, and
(5c) selecting as the lower-cost time period the candidate interval resulting in the lowest cost.

* * * * *